United States Patent Office 3,652,482
Patented Mar. 28, 1972

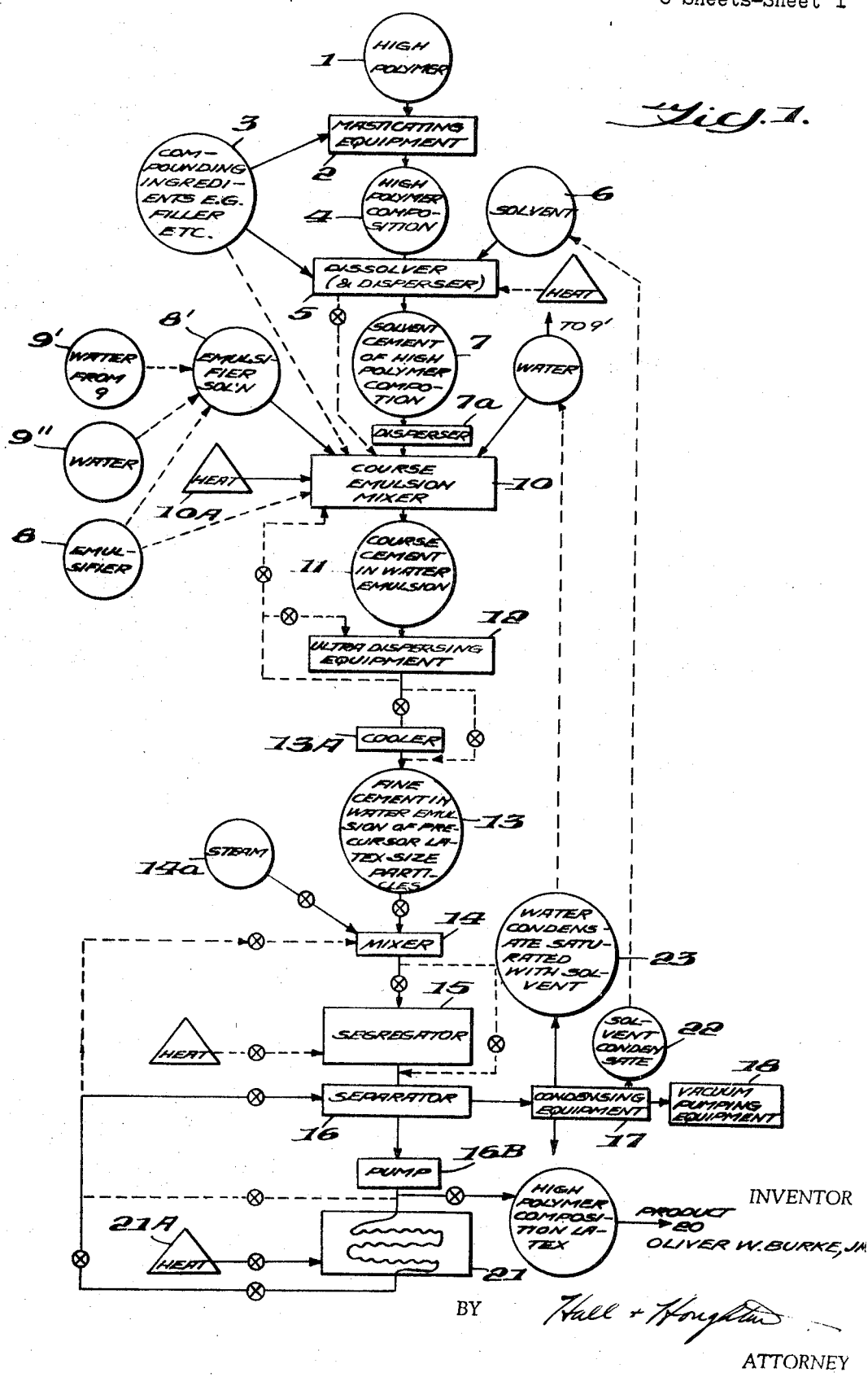

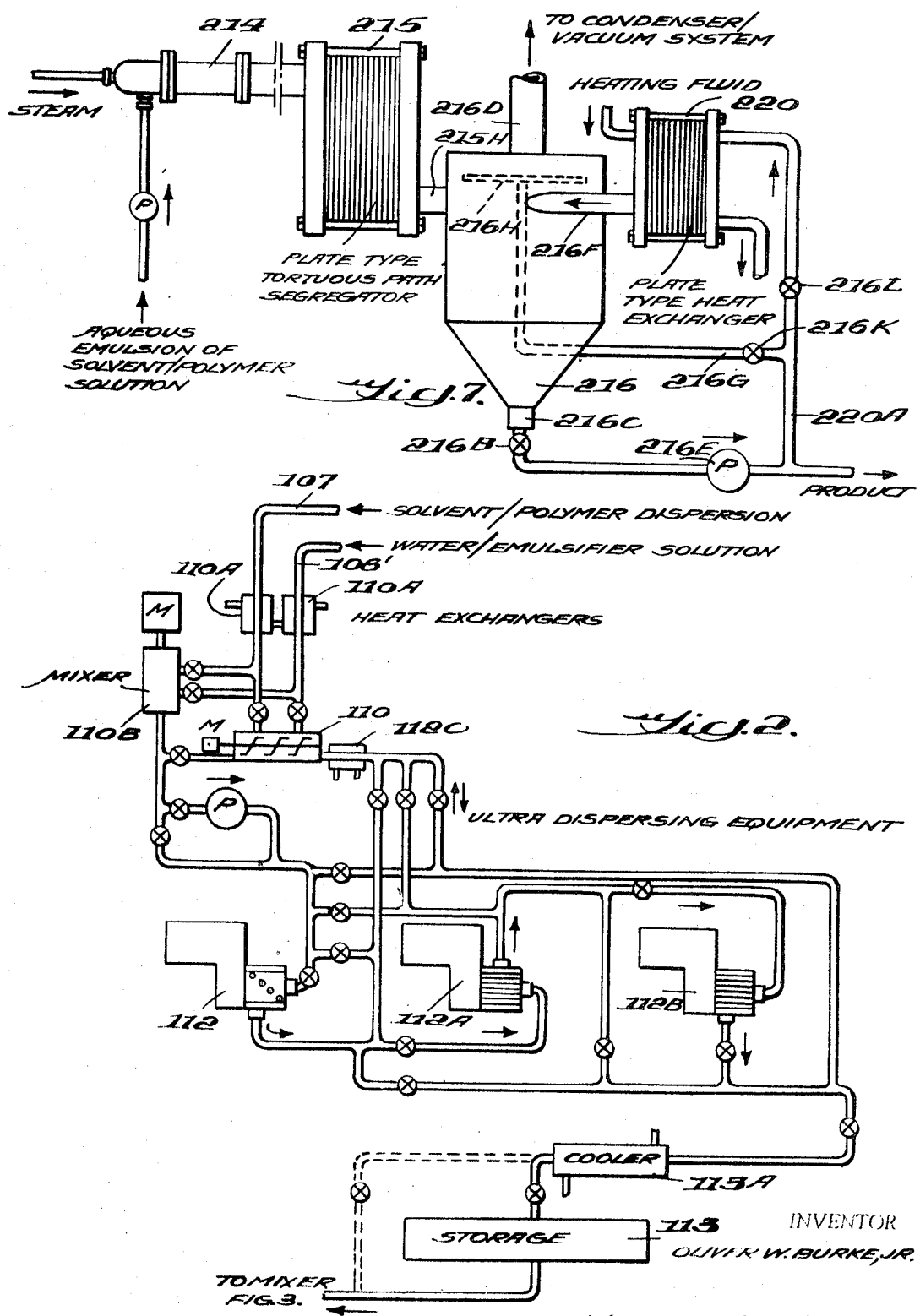

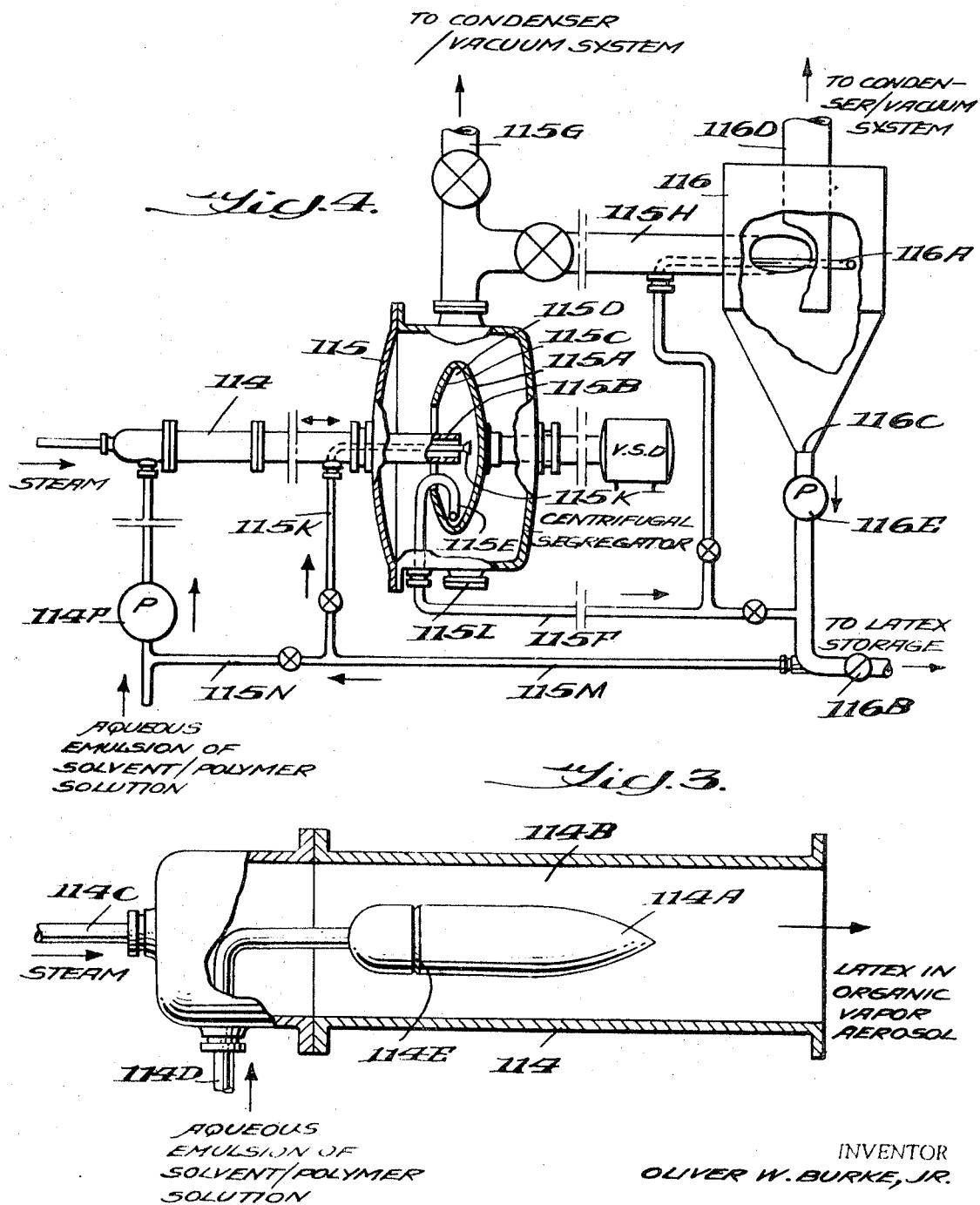

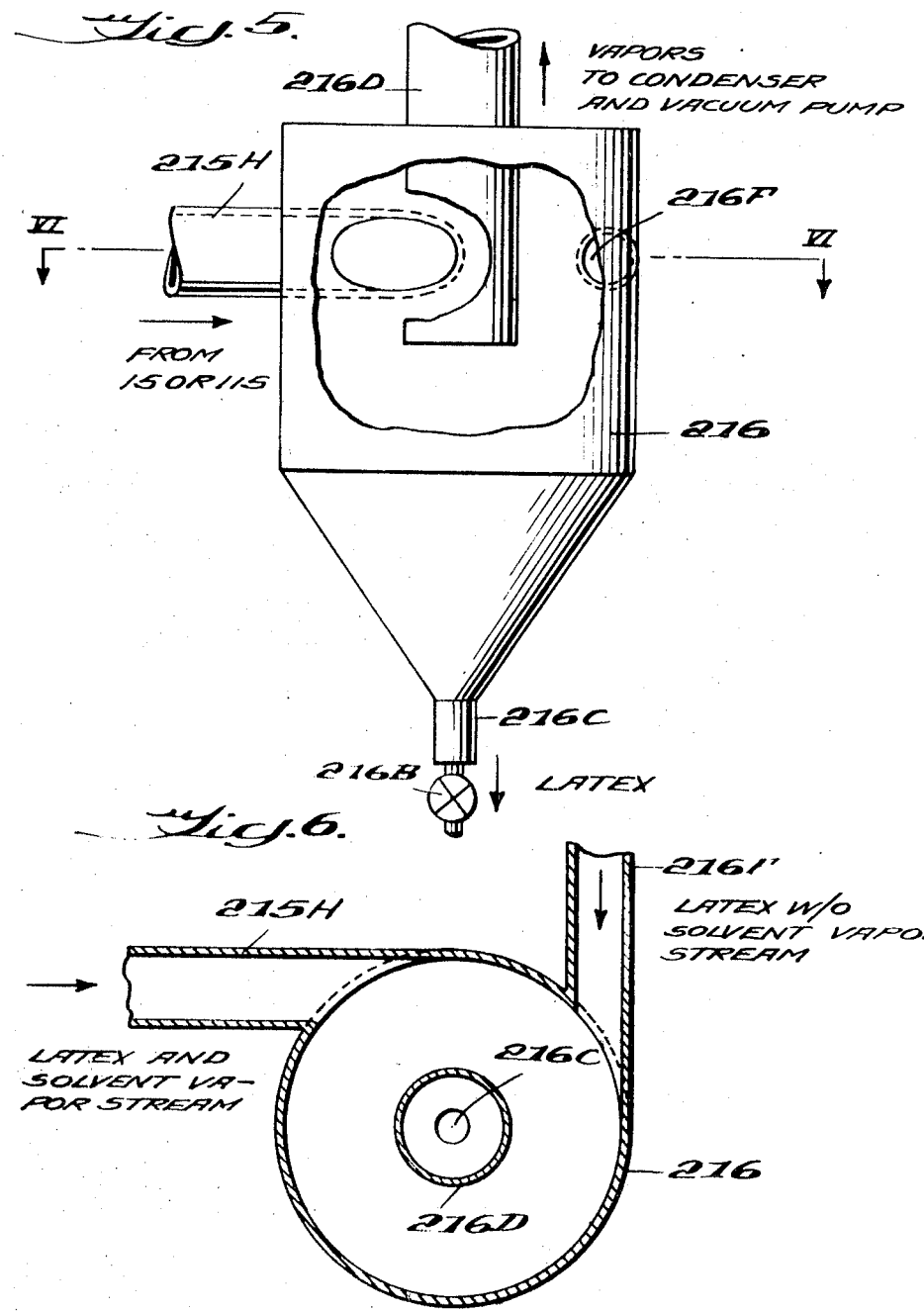

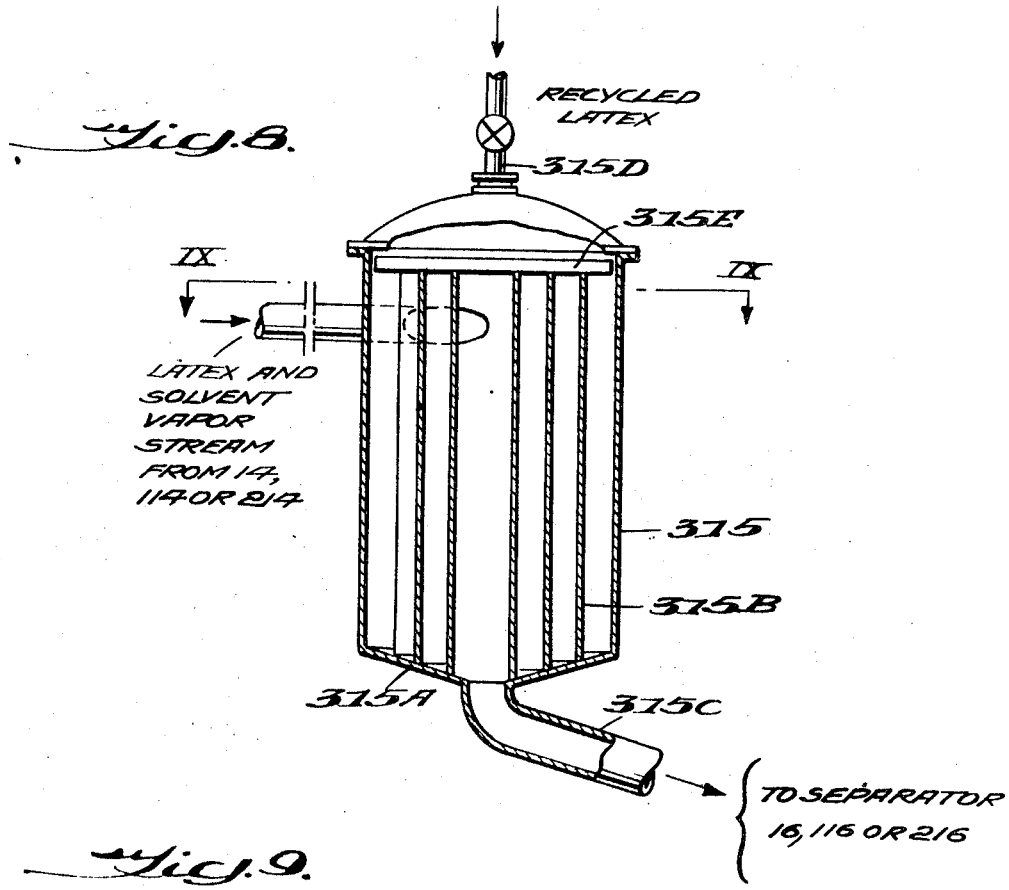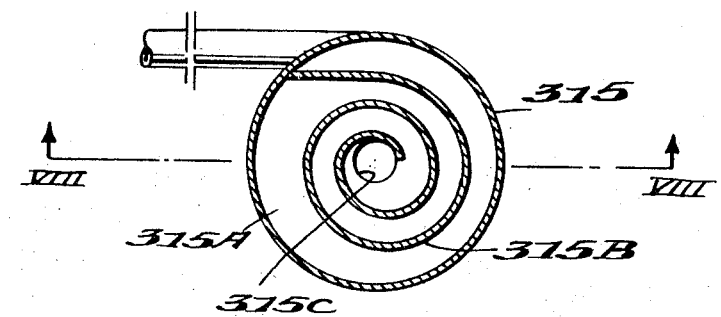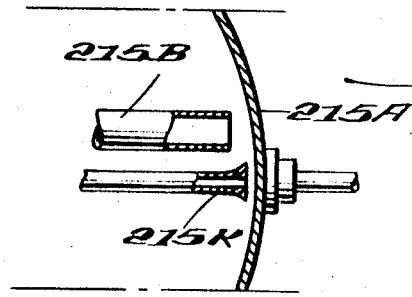

3,652,482
PROCESSES OF PRODUCING AQUEOUS LATICES OF POLYMER COMPOSITIONS
Oliver W. Burke, Jr., P.O. Box 1266, Fort Lauderdale, Fla. 33061
Continuation-in-part of application Ser. No. 691,823, Dec. 19, 1967, which is a continuation-in-part of application Ser. No. 621,997, Mar. 7, 1967. This application Sept. 10, 1970, Ser. No. 70,949
Int. Cl. C08d 7/00; C09d 5/02
U.S. Cl. 260—29.7
40 Claims

ABSTRACT OF THE DISCLOSURE

Aqueous latices are prepared from solvent dispersions of polymer compositions by forming a precursor latex particle size emulsion of the solvent dispersion, converting the same to an aerosol or suspension of latex droplets in a solvent vapor stream, providing a flow of latex, and impinging the suspension on the flow of latex to separate the suspended latex droplets from the solvent vapor stream, preferably after subjecting the suspended droplets to partial coalescence. Latices of elastomers and/or plastomers and/or other high polymer compositions having average molecular weights of the order of $10^3$ to $10^6$ can be produced economically while reducing or eliminating foaming and coagulation losses. Certain embodiments employ particular emulsifier combinations, form latices comprising fillers and/or plasticers or softeners, and/or produce latices of mixed polymers. Particular apparatus combination disclosed, and latices produced, are claimed in separate applications filed pursuant to requirements for restriction under 35 U.S.C. 121.

CROSS REFERENCE TO RELATED APPLICATIONS

This application is a continuation-in-part of my application Ser. No. 691,823 filed Dec. 19, 1967, now abandoned, itself a continuation-in-part of my application Ser. No. 621,997, filed Mar. 7, 1967 now U. S. Pat. No. 3,503,917.

BACKGROUND OF THE INVENTION

(1) Field of the invention

This invention relates particularly but not exclusively to the production of aqueous latices from solvent dispersions of high polymer compositions and aims generally to provide improved processes therefor.

(2) Description of the prior art

To date, in the practical art, synthetic latices of high polymers have been primarily prepared by emulsion polymerization, and such practice has not been applicable to high polymers made by essentially anhydrous catalyst polymerizations. It has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alia, in that (1) solvent dispersions or cements of the high polymer materials, unless quite dilute, have high viscosities, which have rendered it impractical to produce raw emulsion particles of precursor latex particle size from such dispersions when their viscosities have been above the range of 1000 to 7000 centipoises; and when dilute, require the use of undesirably high quantities of emulsifier and the stripping of undesirably large quantities of solvent; (2) in that the emulsions have tended to foam excessively during stripping; (3) in that the emulsions have tended to form coagulum by drying out especially on contact with heated surfaces, during the stripping and/or concentrating processes; and (4) in that all of these problems are accentuated as the aqueous content of the emulsion is reduced.

SUMMARY OF THE INVENTION

By the present invention conditions are created combinations of which alleviate the aforesaid problems and render practical the production of aqueous latices from solvent dispersions of high polymer compositions. These conditions, inter alia, include, severally and in cooperating combinations:

(1) The use of particular solvents for the polymers which are essentially immiscible with water in liquid phase, and which have boiling points less than the boiling point of water at atmospheric pressure, or which form azeotropes with water which having boiling points less than the boiling point of water at atmospheric pressure. Such solvents include the $C_3$ to $C_7$ acyclic hydrocarbon solvents, cyclohexane and methylcyclohexane, the $C_6$ to $C_9$ aromatic hydrocarbon solvents, and the less desirable halo-substituted $C_1$ to $C_5$ hydrocarbon solvents when required and combination of two or more members of the foregoing groups. Preferred are such solvents which have boiling points higher than that of water but which form azetropes with water that have boiling points lower than that of water, which preferred group comprises especially the aromatic solvents including toluene, the xylenes, ethyl benzene, cumene, etc.

(2) The formation of relatively high solids cements of the polymer composition and the solvent therefor selected as aforesaid, which cements preferably have viscosities of over 1000 centipoises and more preferably over 7,000 to 10,000 centipoises, and even over 10,000 to 20,000 centipoises, which high viscosities can be tolerated because of other cooperating steps of the process. The cements of emulsifiable viscosities in the preferred range of 7,000 to 10,000 centipoises generally comprise by weight at least 25% and preferably over 50% of solvent, depending on the polymer to which the invention is applied.

(3) The employment of ultradispersing equipment to reduce the preferred cements to particles of precursor latex size in the presence of the aqueous phase and emulsifier, such ultra-dispersing system combining mechanical, hydraulic, and ultrasonic shear, impact, and vibrating phenomena, which this invention has shown to effect such reduction notwithstanding that such cements may have very high viscosities of up to 7,000 to 10,000 centipoises or higher, and notwithstanding that such cements may have their viscosities increased by the incorporation of fillers so that they will be contained within the precursor latex particles themselves for producing better reinforcement, as is contemplated in certain embodiments of the present invention. The said conditions thus enable the quantities of emulsifier and solvent to be kept relatively low while simultaneously providing precursor latex size particles facilitating the removal of solvent therefrom.

(4) The employment in the process of an emulsifier system which will form a stable aqueous emulsion of the solvent/polymer solution (principally solvent) and which will also form a stable emulsion, and finally a stable latex, of the polymer itself.

(5) The removal of solvent from tiny droplets of the so formed oil-in-water emulsion by introducing the same, as a discontinuous phase, into a flow of gas comprising essentially steam as an initial continuous phase, while subjecting the two phases together to a decrease of pressure and while maintaining the temperature of both phases within the limited range for stability of the emulsion. Solvent is thus vaporized from the precursor latex sized particles while maintaining their stability, so that substantially all the solvent is vaporized into the gaseous continuous phase which thus becomes a gaseous stream carrying aqueous droplets having one or more latex size polymer particles per droplet, the preferred droplet size range being that of an aerosol.

(6) The separation of the resulting droplets of latex from the gaseous continuous phase by coalescencing and collecting the same while avoiding deleterious agglomeration and foaming. The coalescing step may be practiced in several ways which are quite distinct. One of these procedures employs centrifugal force, which may be a number of times the force of gravity, to aid the coalescence or segregation of the latex without foaming. Another procedure passes the two phases turbulently or tortuously through means defining an elongated path to effect the coalescence or segregation into droplets large enough to be readily separated from the gaseous phase as hereinafter described. The separation of the liquid and gaseous phases is affected by providing a flow of latex other than the flow of step (5), and impinging the droplets of latex and vapor produced by step (5) on the so established flow of latex, thereby separating the droplets of latex from the gaseous phase, and the gaseous phase is then passed to a condensing system for recovery of the solvent. The flow of latex so established as a collecting zone, may be formed by effecting recycle of the latex of the selected polymer being separated from the gaseous phase, or may be a latex of greater solids content than that of the droplets being separated, or may be a latex of a differently selected polymer from that being separated providing the two emulsifier systems are the same or compatible with one another, in which event the improvement produces a mixed polymer latex. Throughout the stripping, coalescing and collecting steps: (a) the temperature of the two phases is maintained within the limited temperature range for stability of the emulsion, preferably by controlling the initial continuous phase in temperature essentially to not exceed the limiting temperature for stability of the emulsion and in quantity to be sufficient to substantially effect the stripping of the solvent, and by controlling the temperature and quantity of the emulsion being dispersed therein; (b) the delivery of substantially all of the solvent to the gaseous continuous phase is essentially effected preferably in a single pass by appropriate design of the capacity of the apparatus, and (c) the flow of gas comprising steam as the initial continuum preferably consists entirely of steam at a pressure, when it first contacts the emulsion, to provide a temperature not detrimental to the emulsion, especially where any substantial quantity of solvent is being stripped from the precursor latex sized particles, and under certain conditions it may be desirable to augment the volume or velocity of the initial gas continuum by including therein a minor proportion of non-condensible gas or of solvent vapor before contact thereof with the emulsion.

(7) The latex delivered by the separator is a stable latex suitable for any use for which its solids content adapts it. It is also at a temperature within the limited range for stability of the emulsion and the invention further contemplates that this separated latex, preferably without cooling, may be recycled and be again passed through the centrifugal segregator or the elongated path segregator to remove the last traces of solvent if desired, and particularly to concentrate the latex by removing water therefrom, when a product of higher solids content is desired. When concentrating it is sometimes desirable to reduce, and where the temperature range for stability of the latex permits this to even cut off, the supply of initial continuous phase, e.g. the steam, and to supply moderate external heat to the latex, or through the walls defining the elongated path, to vaporize water from the latex in the reduced pressure equipment to form the continuous phase into which further water vapor enters as the concentration of the latex progresses. The temperature at which the heat is supplied to the latex is maintained at a value which does not overheat the latex, and enables the latex to remain within the limits of temperature in which it is stable, thereby avoiding the formation of undesired coagulum. The concentrated latex effluent as a discontinuous phase from the segregator with the evolved vapor as a continuous phase, may again be separated in the separator, the continuous phase passing to the condensing equipment, and any uncondensables passing therefrom via the pumping equipment.

(8) While for economy of equipment it is sometimes preferred to employ the same segregator, with adjustment of appurtenant equipment as above described, for effecting both the stripping and the concentration, the capacity of the segregator may be adjusted to the load to be served, and when it is desired to concentrate the stripped latex without suspending the stripping operation of the equipment, one or more separate elongated paths or the like may be provided for this purpose, which may terminate in any desired separator equipment, but which preferably terminate in the same collector or separator equipment. The desired concentration may be effected in a single pass, or, if desired, in a plurality of recycles through the same or different concentrating paths. When the latex being concentrated is returned to the same segregating, separating, or collecting equipment, it is preferably distributed on the walls of the segregator, separator, or collector in such a way that the droplets of stripped latex being delivered thereto with the solvent vapor will be impinged on the recycled latex, as aforesaid, as it has been found that this procedure tends to minimize the formation of coagulum and foam.

(9) The water recovered in the condensing equipment is distilled water saturated with the stripped solvent, and in accordance with the present invention it is preferred to recycle this recovered water for use in preparing the emulsion of the precursor latex sized particles of solvent solution of the high polymer composition.

The objects of the invention, severally and interdependently, are to provide new process features and new combinations of steps, which contribute to produce an improved process and which enable the production of new latices which may contain not only polymers and compounding ingredients such as fillers, but which in preferred embodiments may contain such compounding ingredients, e.g. reinforcing fillers, within the high polymer latex particles. Other objects and advantages of the invention will be apparent from the above general description and the following more particular descriptions of preferred embodiments thereof, which, however, are illustrative but not restrictive of the invention, the scope of which is more particularly pointed out in the appended claims.

BRIEF DESCRIPTION OF THE DRAWING

In the accompanying drawing:

FIG. 1 is a flow sheet or diagram illustrating the sequences of steps and flow of materials in typical embodiments of process according to the invention, particularly when applied to high polymer materials under subatmospheric pressures.

FIG. 2 is a diagram of a preferred form of equipment for preparing the emulsion, corresponding to portions 7–13 of FIG. 1, the corresponding elements having the same numerals raised by 100, and respective parts thereof being designated by modifying letters.

FIG. 3 is a similar diagram of a preferred form of device for dispersing the emulsion of solvent/polymer solution into the steam flow, corresponding to element 14 of FIG. 1.

FIG. 4 is a similar diagram of one illustrative embodiment of the portions 14–16 of FIG. 1.

FIG. 5 is a more or less diagrammatic elevation, partly cut away, of a preferred form of separator corresponding to portion 16 of FIG. 1.

FIG. 6 is a more or less diagrammatic horizontal cross-section taken on line VI—VI of FIG. 5.

FIGS. 5a and 6a are views similar to FIGS. 5 and 6 of a modified form of separator.

FIG. 7 is a diagram similar to FIG. 2, of another embodiment of portions 14–20 of FIG. 1.

FIG. 8 is a more or less diagrammatic vertical section, taken on line VIII—VIII of FIG. 9, of another form of segragator corresponding to portion 15 of FIG. 1.

FIG. 9 is a more or less diagrammatic horizontal cross-section taken on line IX—IX of FIG. 8.

FIG. 10 is a detail showing a modification of certain elements of the segregator of FIG. 4.

DESCRIPTION OF PREFERRED EMBODIMENTS

(a) In general

Figure 11:
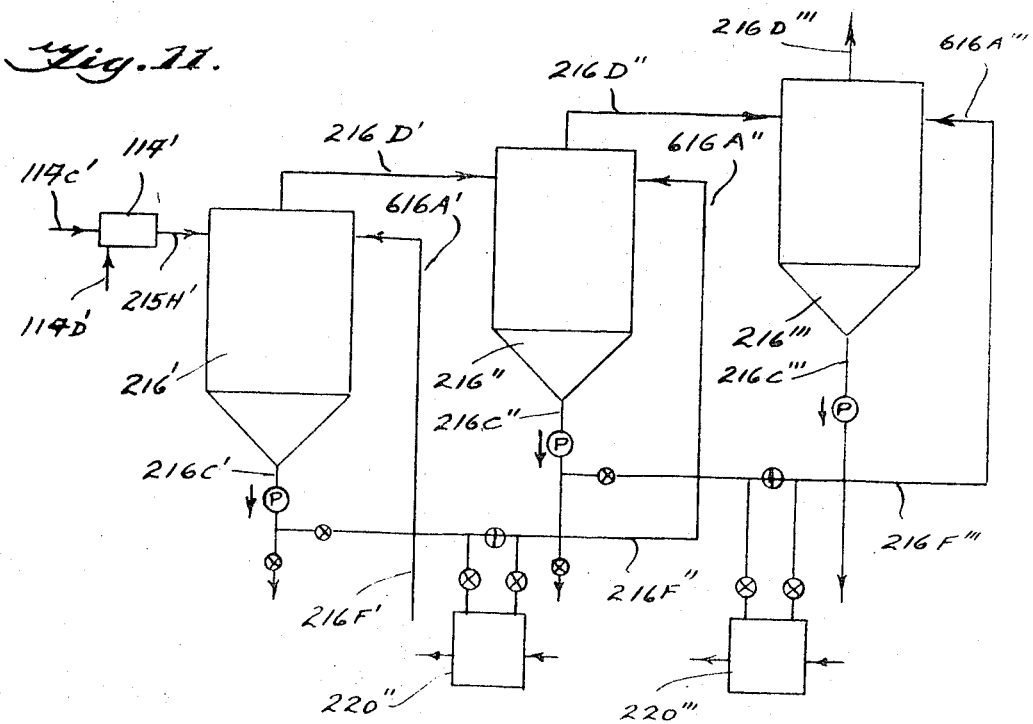
FIG. 11 is a diagram illustrating further modifications.

In the preferred embodiments illustrated in FIG. 1, the high polymer 1, e.g. elastomer and/or plastomer material as hereinafter described, is prepared as a high polymer composition 4 for conversion to a cement, as by working in appropriate masticating, comminuting, or attenuating equipment 2, such as a rubber mill, Banbury, comminutor, extruder, or the like. In accordance with one embodiment of the invention provision is made for incorporating one or more known polymer compounding ingredients 3, e.g. rubber reinforcing filler, into the said polymer composition in such a way that the ingredients 3 are thereafter contained within the polymer particles of the latex being formed, for which purpose the said ingredient or ingredients 3 may be worked into the high polymer 1 by working therewith in the masticating equipment 2. By such procedure the said polymer ingredients may become fixed to the compounding ingredient, however, the combination must disperse in the selected solvent and the resulting cement must be aqueously emulsifiable to form dispersions of precursor particle size. In the case of compounding ingredients desired to be incorporated in the latex particles, but not requiring working with the polymer itself, such ingredients 3 may be fed into the cement forming equipment or dissolver 5 independently of the said polymer composition 4, as is also indicated in FIG. 1.

In the cement forming equipment or mixer or dissolver 5 which may also comprise a disperser, the high polymer composition 4 is combined and preferably stirred or otherwise worked with solvent 6 appropriate for the high polymer and for the process, as furmther described herein, to form a solvent cement 7 of the high polymer composition 4 and of any extraneously added compounding ingredients 3, the adequate dispersion of which in the cement may require vigorous working, which may even be accomplished by the passage of the cement through a suitable dispersing equipment 7a.

The solvent/polymer cement 7 is then combined with emulsifier 8 appropriate for the high polymer and the process, and with water 9 in a coarse emulsion mixing equipment 10 where the ingredients are mixed, preferably with the aid of heat, to form a coarse cement in water emulsion 11, which is then passed one or more times through an ultra-dispersing equipment 12, preferably of the type hereinafter described, which breaks up the relatively large particles of solvent-cement forming the discontinuous phase in the course emulsion 11 into particles of such small size that they will be of stable latex particle size when relieved of their solvent content, and preferably near the upper limit of such size. As indicated in FIG. 1 the emulsifier material 8 may be formed into an aqueous emulsifier solution 8' with water 9' saturated with solvent or with water 9" from an extraneous source. The working in the ultradispersing equipment 12 heats the cement in water emulsion, and the emulsion effluent from the equipment 12 is preferably cooled by passing through suitable cooling means 13A before being passed to the mixing and stripping equipment hereinafter described.

The resulting relatively cool fine cement-in-water emulsion of precursor latex size particles 13 is then stripped of its solvent content without excessive foaming and while avoiding formation of coagulum. In accordance with the present invention it has been found that these results may be best accomplished by first providing a flow of steam 14 as an initial continuous phase and introducing the oil-in-water emulsion of precursor latex sized particles 13 as a discontinuous phase into the flow of steam 14 as the initial continuous phase, whereby volatile solvent 6 is vaporized to become the continuous phase or the principal part thereof, and a corresponding amount of steam is condensed to supply the heat of vaporization for the solvent and become added as water to the discontinuous phase. As this phase transition is accomplished the resulting gaseous and non-gaseous phases are usually in a form resembling an aerosol and the aerosol droplets must be coalesced, with minimum coagulation, to form a latex separated from the vapor phase.

This coalescing step may be practiced by subjecting the gaseous and non-gaseous phases to decreasing pressure, while passing them through a segregator or coalescer 15 and while maintaining the temperatures of the flows within the limited range for stability of the emulsion 13, and the coalesced droplets, now definitely of greater than aerosol size, are collected from the gaseous continuous phase with the aid of a flow of latex. This final separation or collection may be attained by delivering the flows from the segeragator 15 through an essentially unrestricted path into a separator or collector 16, from the lower part of which the latex is drawn, and from an upper part of which the continuous phase is passed to condensing equipment 17 maintained under vacuum, preferably a vacuum of the order of 25 to 29 inches of mercury, by condensing the solvent vapors with the aid of cooling and by withdrawal of uncondensed gases therefrom by vacuum pumping equipment 18, e.g. a steam jet, and the separator or collector 16 may be of various forms and may even be incorporated with the segregator 15 as is hereinafter more fully described.

Still referring to FIG. 1, the high polymer composition latex 19 withdrawn from the separator 16 may be delivered as product 20, or may be recycled as indicated at 21 and be again fed as discontinuous phase through the steam disperser 14 and/or the segregator 15 for removal of residual solvent therefrom as above noted, either separately or concurrently with additional emulsion 13 as is indicated by the valve symbols between 13 and 14 and in the lines from 16B to 14 and from 16B to 16 in FIG. 1; or it may be cycled through the same or a different segregator 15 or 21 for concentrating the latex, in which event the latex is heated to evaporate water therefrom under sub-atmospheric pressure at temperatures within the limited temperature range for its stability, externally to the path 15 or 21 from the valved heat sources shown connected to 15 and 21, while the supply of steam internally of the path from the valved source 14a is reduced or cut off as aforesaid. When such concentrating step has been employed, the product 20 resulting therefrom will be a latex of increased solids content.

(b) The polymer material 1

The new process is applicable to the preparation of latices from solvent solutions or dispersions of high polymer materials which are essentially solvent soluble or dispersable and essentially water insoluble. The terms "high polymers" or "high polymer materials" as used herein designate polymer materials having molecular weights of the order of $10^3$ to $10^6$, in accordance with the usual and accepted meaning thereof (see definition of high polymers set forth at page 1 of the treatise entitled "Principles of High Polymer Theory and Practice" by Professors Alois X. Schmidt and Charles A. Marlies, McGraw-Hill Book Co., New York, 1948). Included in such high polymer materials are natural rubber and high polymers of ethylenically unsaturated monomer material containing from 2 to 20 carbon atoms, preferably from 2 to 10 carbon atoms, as well as the essentially solvent-soluble, water-insoluble condensation products, including, for example, polyurethanes, polyethers, polyesters and polyamides e.g. the nylons. The invention is especially applicable to those elastomers and plastomers which, with or without plasticiser, have the foregoing properties and properties adapting their latices for use as adhesives, binders, film forming materials, coating materials, etc. Examples of such elastomers and plastomers, illustrative but not restrictive of those to which the invention can be applied, are as follows: butyl rubber, chlorinated butyl rubber, polyisobutylene, polybutadiene, polyisoprene, polyethylene, polypropylene (including both amorphous and/or crystalline polypropylene); poly(ethylene-α - monoolefin); poly(ethylene-α-monoolefin-polyunsaturated olefin); e.g. poly(ethylene-propylene), poly(ethylene-propylene-dicyclopentadiene), poly(ethylene-propylene - hexadiene-1,4), poly(ethylene-bicyclo[2.2.1]heptene-2), poly(ethylene-vinyl acetate), poly(ethlyene-vinyl chloride), poly(ethylene-vinyl fluoride), poly(ethylene-vinyl chloride-acrylic acid), poly(ethylene-ethyl acrylate), poly(ethylene-acrylic acid), poly(butadiene - ethylene), poly(propylene-butene-1), poly(butadiene-styrene), nitrile rubber (including butadiene-acrylonitrile and butadiene-methacrylonitrile copolymers), poly(butene-1), poly(4-methyl-1-pentene), polystyrene, polyvinyl chloride, polyacrylonitrile, poly(acrylonitrile-styrene), polymethacrylonitrile, polyvinyl acetate, polyvinyl acetal, polyvinylidene chloride, poly(vinyl chloride and vinyl acetate), poly(vinylidene chloride and vinyl chloride), polytetrafluoroethylene, fluorinated ethylenepropylene copolymer, polychlorotrifluoroethylene, polyvinylidene fluoride and polyvinyl fluoride; and among the condensation high polymers (molecular weight at least $10^3$) are, for example, the essentially water non-soluble ethylene oxide and/or propylene oxide polymers and copolymers, poly(ethylene terphthalates), polycaprolactam(nylon 6), poly(hexamethylene adipamide) (nylon 66), polyethylaminoheptanoate (nylon 7), polyaminononanoate (nylon 9), and any of the foregoing polymers grafted with polar or other polymer grafts, as for example, those set forth in British Pat. No. 878,150 to Burke, published Sept. 27, 1961, and solvent soluble mixed plastomers and elastomers, e.g. butadiene-styrene-terpolymers with styrene copolymer resins including graft polymers thereof, as for example, those set forth in Hayes U.S. Pat. No. 2,802,808, and the like. Particularly included are those polymers which are prepared in essentially water immiscible organic liquid, or under essentially anhydrous conditions, from monomers of the above carbon counts, i.e. 2 to 20, preferably 2 to 10.

The above mention of processing materials, i.e. plasticizers and softeners, has reference to the known materials of this class set forth under the heading "Plasticizers and Softeners" at pages 149 and 214 of the Publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches, e.g. Bardol (TM), Bardol B (TM)[1]; (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20,, –429, –726, –757, –787 (TM), and Califlux TT (TM) and other oils suitable for rubber compounding or the oil extension of synthetic rubber; (d) the coumaroneindene oils and resins, e.g. Cumar Resin RH, –P10, –T(TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125, (TM), Para-Flux, Para Resin 2457 (TM); (h) the hydro-carbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like. Some of these processing materials are polymeric and have number average molecular weights over 1000, and solutions containing such high polymers with or without other polymers may be converted to latices by the process of this invention.

(c) Compounding ingredients (3)

The compounding ingredients 3 which are especially contemplated in the present invention are the solid, particulate, compounding ingredients which are insoluble in the solvents 6, namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pages 278 to 345 of "Compounding Ingredients for Rubber," 3rd edition (1961) published by Rubber World, New York, N.Y., herein incorporated by reference, and on pages 146 to 217 of "British Compounding Ingredients for Rubber" by Brian J. Wilson (1958) published by W. Heffer & Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Pat. No. 799,043 to Burke published July 30, 1958 and in chapter 15 entitled "Reinforcement of Elastomers" edited by Gerard Kraus (1965) published by International Publishers, New York, N.Y., herein incorporated by reference.

(d) The emulsifiers (8)

The invention in its broader aspects is not dependent on the use of any particular emulsifier or combination of emulsifiers, and may be practiced with any selected emulsifier or emulsifier combination suitable for aqueously emulsifying the non-aqueous solvent solutions or disper- ---
[1] (TM) herein designates trademarked products.

sions of the polymer materials concerned, for which purpose the emulsifier or combination of emulsifiers must be water soluble or water dispersible. Emulsifiers capable of forming stable aqueous emulsions with emulsifiable polymer solutions may be selected from the following sub-groups:

(a) One or more anionic emulsifiers.
(b) One or more cationic emulsifiers.
(c) One or more nonionic emulsifiers.
(d) Combinations of anionic and nonionic emulsifiers.
(e) Combinations of cationic and nonionic emulsifiers.

The aionic, cationic and nonionic emulsifiers which are water soluble usually contain from 8 to 22 carbon atoms, when non-polymeric, but such limitation does not apply to those which are polymeric, where water solubility or dispersibility is the criterion. The polymeric emulsifiers are best employed in conjunction with non-polymeric emulsifiers.

Emulsifiers of the anionic, cationic, and nonionic types may be selected from the several groups thereof which are set forth in "Detergents and Emulsifiers 1967 Annual" by John W. McCutcheon, published by John W. McCutcheon, Inc., Morristown, N.J., and especially those listed therein under the headings of emulsifiers suitable for emulsion polymerization or suitable for the emulsification of polymer material, or suitable for the emulsification of hydrocarbons including hydrocarbon waxes, may be used in practicing the present invention. The use of about 10 percent by weight of emulsifier material based on the polymer composition content of the polymer-solvent cement in practically all instances suffices and in most instances 5 to 6 or less percent by weight of emulsifier based on polymer composition content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and water soluble and dispersible emulsifiers having the general formula: $R(OCH_2CH_2)_nOSO_3X$ wherein R is an aliphatic, aryl, alkaryl or cyclic radical, $n$ is 1 to 9, and X is a monovalent alkali metal or ammonium radical.

Typical anionic emulsifiers are set forth in Table A.

TABLE A.—TYPICAL ANIONIC EMULSIFIERS

| Salt | Acid or acid radical | Trade name |
|---|---|---|
| 1. Potassium | Hydroabietic and dehydroabietic. | Dresinate 731. |
| 2. Potassium | Disproportionated tall oil rosin. | Indusoil JC-11B. |
| 3. Sodium | Hydrogenated tallow fatty acids. | Armeen HT. |
| 4. Sodium | Lauryl sulfate | Sipex UB, Dupanol WAQ. |
| 5. Sodium | Tallow sulfate | Conoc Sulfate T. |
| 6. Ammonium | Mononaphthalene sulfonic acid. | Lomar PWA. |
| 7. Sodium | Dodecylbenzene sulfate | Santomerse 85B. |
| 8. Sodium | Polymerized alkyl naphthalene sulfonic acid. | Daxad 15, Daxad 23. |
| 9. Sodium | Alkyl aryl sulfonate | Nacconol 90F, Suframin OBS. |
| 10. Sodium | Alkylnaphthalene sulfonate | Nekal BA-75. |
| 11. Sodium | N-cyclohexyl-N-palmitoyl-taurate. | Igepon CN-42. |
| 12. Sodium | Lauryl ether sulfate | Sipon ES. |
| 13. Sodium | Alkylaryl polyether sulfate | Triton W-30. |
| 14. Sodium | Sulfate ester of nonylphenoxy-poly (ethyleneoxy) ethanol. | Alipal CO-433. |
| 15. Ammonium | do | Alipal CO-436. |
| 16. Sodium | Naphthalene sulfonic acid | Nacconol NRSF. |
| 17. Sodium | Dioctyl ester of sulfosuccinic acid | Aerosol OT. |
| 18. Sodium | Saponified poly(methylvinyl-ether/maleic anhydride). | Gantex AN-139. |
| 19. Sodium | Saponified poly(styrene/maleic anhydride). | Lytron SMA-3000A. |

The cationic emulsifiers include, but are not limited to, the class of emulsifiers which are acid salts of primary secondary, and tertiary amines and the quaternary ammonium type emulsifiers. Typical cationic emulsifiers (used with acids to form water soluble salts when not quaternary ammonium compounds) are set forth in Table B.

TABLE B.—TYPICAL CATIONIC EMULSIFIERS

| Emulsifier base | Trade name |
|---|---|
| 1. Cocoamine | Armeen C. |
| 2. Sterylamine | Armeen T. |
| 3. N-alkyl trimethylene diamines (alkyl groups derived from cocoanut, soya, and tallow fatty acids). | Duomeen C, Duomeen T. |
| 4. Primary fatty amine ethylene oxide reaction products, e.g., $RNH(CH_2CH_2O)_{25}H$. | Priminox T-25. |
| 5. Polyoxyethylated alkylamine | Katapol PN-430. |
| 6. Ethylene oxide condensates with primary fatty amines. | Ethomeens. |
| 7. Bis(2-hydroxyethyl) cocoamine oxide | Armox C/12W. |
| 8. Bis(2-hydroxyethyl) tallow amine oxide | Armox T/12. |
| 9. Amine and quaternary ammonium compounds suitable as asphalt emulsifiers. | Redicote series e.g., Redicote E-4, E-5, E-9, E-12 and E-N. |
| 10. $C_{18}H_{37}(CH_3)_2NCl—(CH_2)_3(CH_3)_3NCl$ | Redicote E-11. |
| 11. Di-isobutyl phenoxy ethoxy ethyl dimethyl ammonium chloride. | Hyamine 1622. |
| 12. N-alkyl trimethylammonium chloride (alkyl=coco or steryl radical). | Arquads. |
| 13. Polyvinylpyrrolidine | PVP. |

Non-ionic emulsifiers can be selected from the class of emulsifiers which are alkyl polyoxyethylene ethers and alcohols, or polyethylene ethers and alcohols. Other non-ionic emulsifiers include those which are polyoxyalkenated alkyl phenols or alcohols having the formula $$R(OCHR_1CHR_1)_nOH$$

where R is an alkyl, aryl or alkaryl group, $R_1$ is an alkyl group or hydrogen and $n$ is an integer of 4 to 10 or even higher. Compounds of this type are prepared by condensing an alkyl phenol or an alcohol with ethylene oxide or propylene oxide. Typical nonionic emulsifiers are set forth in Table C.

TABLE C.—TYPICAL NONIONIC EMULSIFIERS

| Chemical name | Trade name |
|---|---|
| 1. Nonylphenoxypoly(ethyleneoxy)ethanol | Igepal CO-970. |
| 2. Nonylphenyl polyethylene glycol ether | Tergitol TP-9. |
| 3. Polyethyleneglycol fatty ester | Modecol L. |
| 4. Coconut alkanolamide | Monamine AA-100. |
| 5. Polyethyleneglycol 400 monolaurate | Regmol-5942. |
| 6. Propyleneglycol monolaurate | |
| 7. Castordiethanolamide | Emid-6547. |
| 8. Ethylene oxide condensate with primary fatty amides. | Ethomids. |
| 9. Fatty alcohol polyglycolether | Lorox. |
| 10. Sorbitolsesquioleate | Nonion OP-83. |
| 11. Polyoxyethylene lauryl ether | Brij-35. |
| 12. Polyoxyethylene lauryl alcohol | Igepal-430. |
| 13. Polyetherated fatty alcohols | Emulphor-CN, Emulphor-CN-870. |
| 14. Polyoxyethylated octyl phenol having 8 to 10 ethylene oxide units. | Triton X-100. |

The polymeric emulsifiers include the water dispersible polyelectrolytes set forth in Hedrick and Mowry's U.S. Pat. No. 2,625,529 relating to "Methods of Conditioning Soils." In said patent are listed a number of water-soluble polyelectrolytes and these materials are defined as "synthetic water soluble polyelectrolytes having a weight average molecular weight of at least 10,000 and having a structure derived by the polymerization of at least one monoolefinic compound through the aliphatic unsaturated group and substantially free of cross-linking." The present invention has shown that these synthetic water soluble polyelectrolytes can be employed as emulsifiers for the preparation of latices as herein set forth. The disclosed polyelectrolytes of this patent are therefor incorporated herein by reference, it being noted however that the lower limit of molecular weight prescribed by the patentee does not apply, the applicable criterion being that the materials are water soluble or water dispersible emulsifiers.

Combinations of emulsifiers: The present invention has disclosed that by using certain combinations of emulsifiers, it becomes possible to prepare a stable latex from aliphatic hydrocarbon polymers dissolved in hydrocarbon solvents and even in aromatic solvents, as is desirable under certain processing conditions. An effective emulsifier combination for aqueously emulsifying 100 parts by weight of a hydrocarbon rubber dissolved in from about 300 to 600 parts of an aromatic hydrocarbon solvent such as toluene, may comprise 10 parts by weight of a nonionic emulsifier, e.g. polyoxyethylated octyl phenol such as Triton X–100, a trademark product and one part by weight of an anionic emulsifier, e.g. sodium lauryl sulfate.

Another effective emulsifier combination for 100 parts by weight of hydrocarbon rubber dissolved in about 400 parts of aromatic solvent such as toluene combines 3 parts by weight of the aryl anionic emulsifiers, sodium salt of an alkaryl polyether sulfate e.g. Triton W–30 (a trademark product) and 3 parts by weight of the non-aryl anionic emulsifier sodium lauryl sulfate e.g. Dupanol WAQ (a trademark product).

It has for some time been a desideratum in the art to have a stable hydrocarbon rubber latex suitable for combination with asphalt or asphalt emulsion, for road surfacing and roofing purposes, for example. The present invention has disclosed that latices of hydrocarbon rubber such as butyl rubber, polyisobutylene, ethylene -propylene rubber or rubbery amorphous polypropylene, which are suitable for such use, can be prepared by employing as emulsifier for the hydrocarbon solvent solution of the rubber a combination of emulsifiers in which one or more quaternary ammonium emulsifiers (e.g. the quaternary ammonium compounds supplied under the Redicote trademark), are combined with one or more fatty acid amine or diamine type emulsfiers in the ratio of quaternary ammonium to fatty acid amine in the range of from 1:5 to 5:1, nothwithstanding that the quaternary ammonium emulsifiers alone, for the most part, will not form stable aqueous emulsions with the above types of hydrocarbon polymers.

For example a stable aqueous latex is obtained from hydrocarbon rubber e.g. butyl rubber or ethylenepropylene rubber, dissolved in an aliphatic or even an aromatic solvent, e.g. hexane, benzene, toluene and/or the zylenes, with the aid of a mixture of the emulsifiers selected from subgroups (a) and (b) in the ratio of 0.5:5 to 5:0.5 parts by weight, said mixture being employed in an amount of 2 to 10 parts by weight based on the polymer, and said sub-groups (a) and (b) being represented by Formulae I and II respectively:

(I) 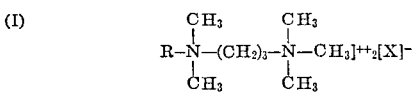

(II.) 

wherein R and R' are selected from the alkyl radicals having from 8 to 22 carbon atoms and X is an acid anion, preferably the alkyl radicals being those derived from coconut oil and/or tallow fatty acids.

The quantity of emulsifier employed in this invention is in the range of 2% to 20% by weight and preferably 5% to 10% by weight based on the high polymer composition; and if desired, small additions of electrolyte may be made to the latex or in preparing the course or fine emulsion, as, for example, in accordance with the practices referred to in U.S. Pats. Nos. 2,955,094 issued Oct. 4, 1960 and 3,222,311, issued Dec. 4, 1965, to Esso Research and Engineering Company, as assignee of R. S. Brodkey et al., and A. L. Miller et al. Alkali metal acid phosphate salts are suitable for this purpose.

(e) Equipment

Homogenizer: While the invention in its broader aspect is not limited to any particular homogenizer, the invention has disclosed that certain types of homogenizer described in Mould, Jr. Pat. No. 3,195,867 [2] and Hager Pat. No. 3,194,540 [2] as suitable for low viscosity materials

[2] Both herein incorporated by reference.

such as milk, oil, fruit slurries, etc., can be employed effectively as an ultra-disperser of aqueous emulsions of highly viscous solutions of high molecular weight polymer compositions, especially when connected in tandem, and/or for recycle and/or to operate under substantial input pressure head.

In FIG. 2 there is shown an arrangement of such homogenizers to constitute an ultradispersing equipment. This arrangement is provided with optional facilities selectively employable by means of valves for continuous or batch operation, for single unit or tandem unit operation, and for selective complete or partial recycle in each mode of operation, and it will of course be understood that where certain of these optional facilities are not desired they may be omitted without departing from the invention.

In this FIG. 2 arrangement the solvent and polymer dispersion 107 and the water and emulsifier solution 108' are adjusted in temperature by heat exchangers 110A and passed to the course emulsion mixer equipment. For batch operation, as shown, this equipment may be in the form of a hold tank 110 provided with an agitator. For continuous operation, as shown, it may be in the form of in-line mixing equipment 110B. The in-line mixer equipment 110B may also be employed to premix the materials being delivered to tank 110 for batch operation. The coarse emulsion in batch operation is passed from tank 110 under gravity head and/or pressure head contributed by pump 110C to the ultradispersing equipment 112 and/or 112A and/or 112B, or for continuous operation may be passed to the latter directly from the in-line mixer equipment 110B, and under the head developed thereby augmented, if desired, by the head developed by pump 110C. The coarse emulsion under pressure as aforesaid may be passed through any one or more of the ultradispersing equipments 112–112B and may be recycled therethrough either directly, or by way of the coarse emulsion tank 110. When the preparation of the emulsion of precursor latex sized particles has been completed this intermediate product may be delivered to storage 113, preferably being cooled by means of a cooler 113A to assure maintenance of the emulsion even with minimum quantities of emulsifying agent present. As is indicated in FIG. 2, optimum results have been attained by repeatedly passing the coarse emulsion through an equipment 112 of the perforated stator type shown in Mould, Jr. Pat. No. 3,195,867, and then through one or more equipments 112A and/or 112B in tandem with, and similar to equipment 112 but provided with a slotted stator of the type illustrated in FIGS. 5 and 7 of Hager Pat. No. 3,194,540, with recycling from equipment 112A to the tank 110 and then by gravity head through equipments 112 and 112A, about a half dozen to a dozen times before delivery of the resulting product to the storage tank 113. During recycling, especially with sensitive emulsion prepared with a minimum of emulsifying agent, it is desirable to cool the emulsion which has been heated by working in the ultradispersing apparatus, by means of a heat exchanger in the recycle line, as at 112C.

Stripping mixer: The stripping mixer 14 (FIG. 1) which disperses the aqueous emulsion of precursor latex sized solvent/polymer droplets into the gaseous stream of steam is preferably of the type illustrated in FIG. 3, consisting of a conduit section 114, which may be transparent, which has supported centrally thereof a torpedo shaped or fid-shaped member 114A for producing a restricted or venturi-effect passage 114A thereabout. The initial continuous phase of steam is admitted as at 114C to flow through the passage 114B and produce an area of high velocity and low static head thereat. The aqueous emulsion of solvent/polymer solution is introduced into the central body 114A as by way of the tube 114D upon which it is supported, and issues into the gas stream via a narrow slot 114E extending peripherally of the body 114A at the region of greatest pressure reduction in the space 114B. The outlet of the section 114 connects to condensing equipment by way of the segregator and collector devices, as exemplified in FIGS. 4 and 7, and the pressure in chamber 114 is such that the temperatures attained do not exceed those at which the emulsion and latex are stable. The heat for vaporization of the solvent from the solvent/polymer solution is for the most part derived from the condensation of the steam, and the flowing stream of organic vapor carrying the resulting suspended latex droplets is in the nature of an aerosol, exhibits no foaming in the tube 114, and does not coat or foul the tube 114. As is illustrated in FIG. 4, the aqueous emulsion of solvent/polymer solution is usually supplied to the mixer 114 under pressure, as by a pump 114F.

Elongated path progressive segregating means: The stripping operations of the process in certain embodiments thereof may be practiced with any suitable segregating means which provides an elongated path for turbulent or tortuous flow of the latex droplets constituting the discontinuous phase together with the vapor stream constituting the fluid driving continuous phase, with a decrease in pressure as the two phases progress along the path, the turbulence being such as to gradually coalesce the aerosol sized latex droplets into droplets of a size that can be separated from the gaseous stream carrying the same, while avoiding excessive foaming and while maintaining the temperature of the two phases within the limited range for stability of the oil-in-water emulsion concerned. While a number of types of apparatus are adaptable for the purpose, an effective and possibly the most compact arrangement is afforded by a heat exchanger of the corrugated plate type, arranged with the spaces between adjacent pairs of plates connected in series to afford the elongated tortuous path terminating in an evacuated separator or collector device.

Such an arrangement is illustrated in FIG. 7, wherein the aerosol like suspension from the mixer 214 is delivered through the plate type segregator 215 to the separator or collector 216, all under decreasing pressure.

Alternative elongated path progressive segregator means: Another form of segregating means well adapted to coalesce the latex droplets carried by the solvent vapor stream so that they can be collected or separated therefrom, is illustrated in FIGS. 8 and 9, and comprises a generally cylindrical collector 315 having a conical bottom 315A, and having a spiral partition 315B therein to cause the latex droplets and solvent vapor stream carrying the same, which are delivered thereto from the mixer 14, 114 or 214, to expand and follow a spiral elongated path the curvature of which causes the latex droplets to coalesce in juxtaposition to the outer bounding walls of the spiral path, the coalesced materials draining to the bottom of the segregator from which they are delivered with the vapor stream through a passage 315C leading to a collector or separator 16, 116 or 216. Preferably the collector 315 is provided with an inlet 315D for recycled latex at its top, and means is provided for distributing said recycled latex to flow down the bounding walls of the spiral passage, as by suitably perforating the top bounding wall of the spiral passage, shown in the form of a plate 315E resting on the upper edge of the spiral.

High-G latex droplet segregating means: An alternative and sometimes preferred form of segregating means is that illustrated at 115 in FIG. 4, in which a variable speed drive VSD rotates a centrifugal disc or cup 115A housed in a reduced pressure chamber. The aerosol-like suspension of latex droplets in the solvent vapor stream is projected from an inlet conduit 115B against a central portion of the rotating cup 115A, and latex droplets coalesce against the rotating surface of the cup and travel outwardly therealong, the inclination of the surface determining what part of the centrifugal force developed tends to move the coalescing latex along the cup wall and what part thereof tends to press the coalescing latex against the cup wall for aiding in preventing foaming. The cup is provided at its outer periphery with an inwardly curved annular flange 115C defining with the disc like portion of the cup a collector trough 115D, and a scoop element 115E carried by the casing in position to project into the trough 115D, picks up the latex gathered in the trough to greater than a predetermined depth, with or without some vapor, depending on the conformation of the scoop 115E, and delivers it through an outlet conduit 115F. The principal part of the vapor phase, which is substantially freed of latex droplets in the cup 115A, passes from the reduced pressure chamber to the condensor and vacuum system either directly, as indicated at 115G, or via a connection 115H to a collector 116, as shown. Especially when the connector 115H is used to convey the gas stream and residual latex therewith to the collector 116, the coalesced latex being delivered by conduit 115F is delivered, as by line 115J to flow in a sheet like manner down the walls of the collector 116 from a distributor 116A, and the droplets entering with the gas via 115H are impinged on the flowing latex, which procedure has been found to help to minimize foaming.

To further reduce tendency to foam, in accordance with a preferred embodiment of the present invention, means is provided for producing a flow of latex of substantial volume substantially covering the disc 115A from its center and throughout the area upon which the projected latex droplets impinge, this means, in the form shown in FIG. 4 comprising a conduit 115K, located centrally of the aerosol conduit 115B and discharging against the center of the disc 115A. The flow of latex delivered from 115K may be recycled latex from the collector 116, or may be a partial recycle of the latex removed by the scoop 115E. When complete recycle is being practiced outlet valve 116B may be closed. When partial recycle is being practiced, valve 116B may be partially opened. When the conditions are such that a single pass through the centrifugal coalescer or segregator effects substantially complete separation of the gas and liquid phase of the aerosol use of parts 115H and 115J may be dispensed with and the material from the scoop 115E may be passed directly to latex storage, preferably by way of the collector 116 for freeing it from any gaseous phase entrained by the scoop 115E. The reduced pressure chamber 115, in the form shown, is provided with a drain sump 115L at its bottom, through which may be removed any material depositing in the same. If desired the vapor delivery conduit means 115G and/or 115H may be connected at 115L and the conduit 115F may pass through an upper wall of the reduced pressure chamber, for facilitating delivery of the materials to the collector 116.

In an alternative construction, as shown in FIG. 10, the latex recycle conduit 215K may be provided with a mushroom end under which the latex is spread as an expanding sheet on the disc 215A, and the aerosol delivering conduit 215B may be positioned adjacent to but not concentric with the conduit 215K.

Separating, condensing, and evacuating apparatus: As will be apparent to those skilled in the art the invention in its broader aspects is not dependent on the use of any particular type of separating, condensing and evacuating apparatus. Conveniently, when stripping azeotroping solvent, as a separator or collector 16 may be used a vertical cylindrical receiver, with a downwardly tapering bottom leading to a discharge opening connected to a positive displacement pump 16B for removal of separated latex therefrom, with a tangential side opening for passage of the two flows thereinto, and with a top opening for the discharge of the continuous phase to the condensing equipment 17. The latter conveniently may comprise two condensers, one for non-azeotroped water, and the other operating at a lower temperature for azeotrope of water and solvent. The evacuating apparatus 18 conveniently may comprise a steam jet evacuation equipment connected to draw non-condensed material from the condenser equipment, or a vacuum pump, when employing sub-atmospheric pressure in the condenser. When employing lower boiling solvents such as butane, pentane, or hexane, the portions of the system concerned with the recovery thereof may be operated above atmospheric pressure, and the condensing equipment 17 may be in the form of a compressor for liquification of the gaseous phase, and in such case the concentrating of the latex by removal of water therefrom is preferably conducted in a separate equipment operating under reduced pressure, as elsewhere described herein.

In the form shown in FIG. 4, the collector 116 generally resembles a cyclone collector into which the gaseous flow and any latex droplets carried thereby are discharged tangentially from the inlet 115H, and guided along the walls by appropriate internal baffling, e.g. the drop tube 116D, so that the liquid collects on the walls and flows to the bottom outlet 116C, while the gas passes to the top outlet by way of the passage afforded by the central drop tube, or equivalent baffling means, 116D to the condenser/vacuum system. Pump means 116E delivers the latex from the outlet 116C through the outlet valve 116B or, depending on pump and valve setting, wholly or partly via the recycle lines 115M, 115K to the disc 115A and/or via lines 115M, 115N to be added to the emulsion of solvent/polymer solution being delivered to the mixer 114. As before mentioned, the walls of the collector 116 are preferably covered by a flow of latex from a distributor 116A, which provision facilitates the collection of the latex droplets delivered by the gas stream while minimizing foaming.

In the form shown in FIGS. 5 and 6, which is also used in FIG. 7, the collector 216 comprises similar elements 216B, 216C, and 216D, but in this instance instead of a latex distributor of the type shown at 116A in FIG. 4, the collector is provided with a second tangential gas inlet 216F through which is supplied concentrated latex droplets suspended in a gas stream consisting substantially entirely of water vapor evolved from the more dilute latex. The concentrated latex may be derived from a concentrating circuit as hereinafter described in connection with FIG. 7, and the present invention has discovered that it can be processed at a higher rate and volume than can the unconcentrated latex without producing objectionable foam, presumably because of some relation between the solids content and viscosity and the tendency to foam. Thus with this arrangement large volumes of latex may be circulated and concentrated and collected concurrently with the collection of the stripped latex in the same collector 216, and the coating of the walls of the collector with the concentrated latex to entrap and to collect the stripped latex droplets impinging thereon also greatly increases the rate at which the stripping can be conducted.

Figure 6A:
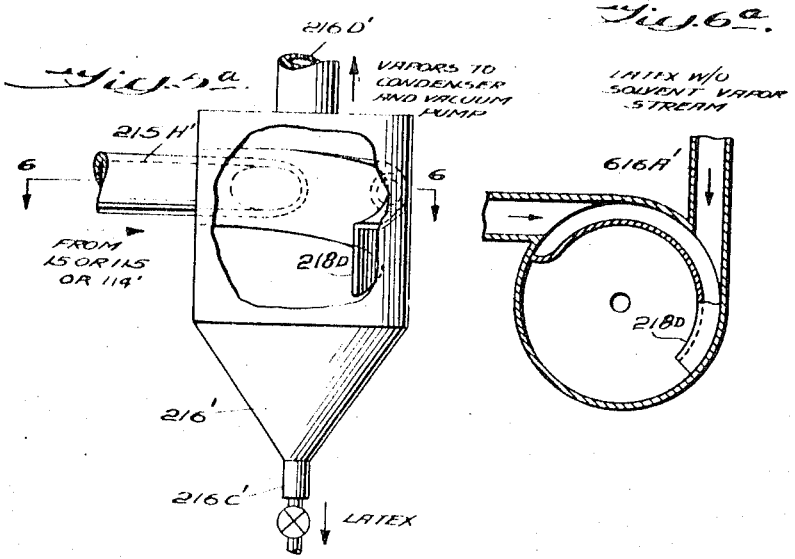

In the form of FIGS. 5a and 6a, which may also be used in FIG. 7, the parts corresponding to those of FIGS. 5 and 6 are designated by the same numerals with added prime marks. In this form the materials being impinged are subjected to centrifugal force and intimate contact by flowing them through a narrow annular downwardly opening space defined by the separator wall and a depending skirt or baffle 218D.

Elongated path progressive concentrating means: A concentrating circuit as above described is illustrated in FIG. 7 and comprises a source of latex, i.e. stripped and/or partially concentrated latex, to be concentrated, herein in the delivery outlet of the collector 216C, controlled by valve 216B. The stripped latex from the source is delivered by pump means P through recycle line 220A to a heat exchanger 220 which provides an elongated and tortuous path for the flow of the material being concentrated and a second path for heating fluid. The tortuous path is externally heated at least over portions of its length by hot water passing through the second path, and since the outlet of the heater 220 has quite unrestricted communication with the condensing and vacuum equipment via the conduit 216F and collector 216, the heating of the latex in the heat exchanger 220 causes evolution of water vapor therefrom to constitute a continuous gaseous driving phase, which increases progressively as the two phases progress along the tortuous path, the turbulence being such as to continually break up and reform the liquid discontinuous phase, thus causing vapors to pass therefrom into the continuous phase without excessive foaming and while maintaining the temperature of the two phases within the limiting temperature for stability of the latex. While a number of types of apparatus are adaptable for this purpose, an effective and compact arrangement is afforded by a heat exchanger 220 of the corrugated plate type with latex circulated between pairs of plates and heating fluid, preferably hot water, circulated in the spaces between the pairs of plates enclosing the latex.

Suitable means is also provided to enable the supply of latex to effectively coat the walls of the separator 216 when the concentrating of latex is reduced or suspended, herein in the form of a by-pass line 216G which terminates in a distributor element 216H for spraying or flowing the latex delivered from pump 216B onto the inner wall of the collector 216 to coat the area thereof on which the effluent foam 216H impinges. By adjustment of the valves and the pumps controlling flow through the by-pass and flow through the heater 220, the volume of stripped latex supplied to the walls may be varied while maintaining efficient operation of the heat exchanger 220 and without excessive heating of any part of the recirculated latex.

Features, such as the latex recirculation and/or concentration systems, disclosed in connection with one embodiment of the equipment herein, e.g. in FIGS. 5–7, may be employed in connection with any other of the disclosed arrangements, e.g. those of FIG. 4, as will be apparent by one skilled in the art.

FIG. 11 illustrates diagrammatically a further preferred embodiment of collector or separator system embodying features of the invention. In this arrangement the separators 216′, 216″ and 216‴ may be of the type illustrated in detail in FIGS. 5 and 6, or 5a and 6a. Separator 216′ comprises a first tangential inlet for the latex and solvent vapor stream 215H and a second tangential inlet 616A′ for a stream 216F′ of latex without solvent vapor, e.g. latex or latex and water vapor from a recirculating and/or concentrating circuit as illustrated at 216F to 216L in FIG. 7, or latex from any other source, or of a different polymer composition than that carried by the stream 215H′, when a mixture of latices is to be produced. In FIG. 11, the latex and solvent vapor is delivered tangentially into the separator 216′ directly from the mixer 114′ (cf. FIG. 3), without the interposition of any initial segregator 15, 115, or 315. The vapor outlet 216D′ from the segregator-collector 216′ delivers to the first tangential inlet of a second collector 216″, in which the second tangential inlet 616A″ supplies a stream of latex 215 F‴ to entrap any latex droplets and foam carried thereto via 216D′, such stream of latex preferably being pumped from the outlet 216C of the first separator 216′ and optionally being heated as by a plate heater 220″ before being delivered to separator 216″ to a sufficient extent to evolve further water vapor from the latex in separator 216″ for concentrating the latex. In like manner the gaseous phase from 216″ may be delivered via 216D″ to a third separator 216‴, together with optionally heated latex, preferably from 216″ via 216C″ and 616A‴. When the several separators are made progressively smaller, or when heaters 220″ and 220‴ are used and steam is evolved in the respective separators, the gas velocities increase progressively, aiding the throwing down from the vapor stream of the small quantities of latex carryover (droplets or foam) in the separators 216″ and 216‴. When using this arrangement without any segregator 15 ahead of the collector 216′ to coalesce the droplets of latex without foaming, carryover of latex may occur through the outlet 216D'. However, by employing one or more of the back-up separators or traps (two of which are shown at 216" and 216''' in FIG. 11) any carried over latex may be thrown down, with or without the aid of increased velocity, thus preventing loss of the carried over material.

(f) Cement viscosities

While the invention in its broader aspects is not limited to the employment of highly viscous cements, in preferred embodiments great improvement in efficiency is effected by the use of high solids cements in aromatic solvents which have higher viscosities than those heretofore proposed for the preparation of latices, and which can be employed because of the cooperating features of the invention. Typical of cement viscosities which can be employed in this invention are the following Butyl Rubber Cements:

| Butyl rubber,[1] percent | Solvent | Viscosity at 26° C., cps. |
|---|---|---|
| 19 | Toluene | 7,000 |
| 19 | Xylene[2] | 6,500 |
| 21 | Toluene | 11,300 |
| 21 | Xylene[2] | 11,000 |
| 23 | Toluene | 19,000 |
| 23 | Xylene[2] | 17,000 |
| 25 | Toluene | 31,000 |
| 25 | Xylene[2] | 28,000 |

[1] Enjay Type 268.
[2] Mixed xylenes.

As above noted the present invention enables latices to be formed from such high viscosity dispersions of the high polymer compositions and it is accordingly preferred to use such solutions of at least 10,000 centipoises viscosity at room temperature, and even those of above 20,000 centipoises at room temperature may be used in certain instances.

(g) Employment of other concentrating steps

In the process as generally described under (a) above, it has been pointed out that the dilute latex resulting from the stripping step may be concentrated to a high solids content of over 60% as by repeated passes through the elongated path concentrating means described under (e) above. When desired, the concentration of the latex may be partially accomplished by other concentrating procedures. When the uses for which the product will be employed require a product free of any creaming agent, the dilute latex may be passed directly to the elongated concentrating path, or may be passed thereto after a partial concentration by centrifuging, and the resulting product will then be free of any content of creaming agent. When the uses to which the products will be put permit, the dilute latex may be partially concentrated by creaming, using the creaming agents and procedures set forth at column 7, lines 6 to 56 of Burke et al. U.S. Pat. No. 3,278,467, issued Oct. 11, 1966, herein incorporated by reference. As these other concentrating procedures do not involve evaporative concentration, they are herein termed nonevaporative concentrating procedures.

As specific illustration of the practice of the invention by the procedures above described reference may be had to the folowing examples which are illustrative, but not restrictive, of the invention.

EXAMPLE 1

Preparation of butyl rubber latex

The coarse emulsion for this example was formulated, except for the aromatic solvent toluene, in a manner similar to that used in Example 1 of U.S. Pat. No. 2,936,295 granted to Esso Research and Engineering Company assignee of R. S. Brodkey, R. Miller and A. L. Miller, on May 10, 1960.

To a sigma blade mixer was added 80 lbs. of butyl rubber and 300 lbs. of toluene. The mixer was run for twelve hours and a clear cement resulted. The temperature of this cement was raised to 70° C. and cement was then mixed with 300 lbs. of water also heated to 70° C. and containing 4.8 lbs. of the sodium salt of nonylphenylether of polyoxyethylenesulfate containing about 4 ethylene oxide units.

The coarse emulsion at 70° C. obtained in the sigma blade mixer was then passed 8 times through a homogenizing circuit comprising in series the two forms of disperser 112 and 112A described above in connection with FIG. 2, each operated at 5200 r.p.m. with the aid of a 5 horsepower motor. The resulting fine cement-in-water emulsion was stable and showed no tendency to oil out, and thus was stable in a range of temperatures including ambient temperature to 100° F. pending further processing.

The fine cement-in-water emulsion was then injected as illustrated at 214 in FIG. 7, with a stream of steam expanded down to a sub-atmospheric pressure measured as a vacuum in the range of 21 to 26 inches of mercury depending on the rate of feeding of the steam and emulsion, which were fed in the proportion of about one pound of steam per four pounds of the toluene content of the cement, and the output of the unit 214 was delivered into the elongated decreasing pressure tortuous flow path provided by parallel connected spaces between adjacent pairs of plates of a corregated plate type heat exchanger as illustrated at 215 in FIG. 7, no heat being supplied to the intervening spaces between such pairs of plates. The outlet of said heat exchanger was connected through a separator nad condenser system to a source of vacuum of between 28 and 29 inches of mercury. The cement-in-water emulsion dispersed as a discontinuous phase in the steam as a continuous phase, and both phases were reduced in pressure at an average rate of about ⅓ inch of mercury per foot of path travelled, straight through basis, by a substantially adiabatic expansion which subjected the two phases to decreasing pressure while maintaining the initial temperature thereof at about 77° C., i.e. within the limited range for stability of the emulsion. The effluent from the tortuous path was delivered to a separator of the type shown in FIGS. 5 and 6 without restriction, and the flow rates of the steam and the aqueous emulsion of solvent/polymer solution were adjusted to attain as large a throughput as possible without detrimental foaming producing carry-over from the separator, and the continuous vapor phase free of any foam was passed to the condensing equipment, where the water in excess of the quantity azeotroped with the solvent was condensed in a first stage, the remaining azeotrope being condensed in a second stage and separating into solvent and water layers immediately on condensing. The solvent was substantially all accounted for in the gaseous phase; the separated latex from this initial stripping operation contained about 18% solids, dry basis, contained no observable coagulum or floc, and was useful as a dilute adhesive composition, the yield being essentially quantitative based on the charged solids.

The stripped latex being so separated was passed through a concentration circuit from the separator outlet through a plate type heat exchanger and back to the separator, in th emanner illustrated in FIG. 7, circuit 216, 216B, 220A, 220, 216F, concurrently with the stripping of further latex in the equipment 214, 215, 215H to 216. The concentrating circuit was maintained at a decreasing pressure from its entrance end at 220A to about 28 inches of vacuum at the separator, and the path through the heat exchanger 220 was heated externally by hot water at about 95 to 110° C. passed through the spaces between the pairs of plates, which temperature was within the range for stability of the emulsion. By this procedure water was evaporated from the latex to augment the continuous vapor phase and the two phases were subjected to decreasing pressure in a slow gradient ending at about 28 inches of vacuum, at the separator. The volume of liquid discharged into the separator-collector 216 from the inlet 216F, depending on the speed of operation of the variable speed pump 216E, was set at about 10 times the volume of liquid delivered thereto from the inlet 215H, and the latter impinged on the former and was trapped thereby. The establishment of this condition allowed the rate of steam and emulsion feed to the mixer 214 to be increased without causing carry-over through 216D to over 50% more than the greatest throughput possible when the stripping was conducted without the concurrent operation of the concentrating cycle in the same collector-separator 216. From the separator 216 the vapor phase which was foam-free was drawn off to the condenser system along with the solvent vapor stream from the stripping operation, and the combined latex of increased solids content in the separator 216 was pumped back to and recirculated through the elongated path concentrator while continuing the feed through 214 until the combined latex attained a solids content of 65% solids, dry basis, without loss of its stability, without appearance of any observable floc, and with essentially quantitative yield based on the charged solids, at which point combined latex of 65% solids content was drawn off as product as indicated in FIG. 7, and at 20 in FIG. 1.

Examples 1-A and 1-B: Example 1 was repeated twice, each time with a batch comprising eleven times the quantities of materials, combined in the same proportions, as in Example 1. In the first repetition, Example 1-A, the latex concentrating step was not practiced concurrently with the stripping step, the dilute latex produced by stripping being delivered to a hold-tank, and being subjected to the concentration step after the stripping of the batch had been completed. The rates of supply of the steam and emulsion to the mixer-stripper 214 were adjusted to obtain as large a throughput as possible without producing carry-over from the separator through the line 216D. The stripping of the batch under these conditions required about 12 hours. The operation of the mixer stripper 214 was then suspended, and the operation of the concentrating circuit was commenced with the temperature of the heating fluid in heater 220, and the rate of latex feed through the circuit 220A and 216L, adjusted to obtain as fast a concentration as possible without heating the latex above the limiting temperature for its stability and without deleterious foaming in and carry-over through the line 216D. The concentration of the batch of latex to a solids content of 65% under these conditions required approximately 4 hours.

In the second repetition, Example 1-B, the stripping was run alone, at the same rate as in Example 1-A, until sufficient latex, less than half a barrel, had accumulated in the bottom of the separator 216 to enable starting of the concentrating step. The concentrating step was then started to run concurrently with the remainder of the stripping operation, with the rate of flow through circuit 220A-216L at about half the rate used in Example 1-A and the temperature of the heating fluid supplied to 220 correspondingly reduced. The rate of delivery of steam and emulsion to the mixer-stripper 214 were readjusted under these conditions to attain as large a stripping throughput as possible without causing such foaming of the combined latices in the separator as to produce carry-over through 216D. Under these conditions the total time for stripping the batch was reduced to about 8 hours, and well before the end of that time the combined latices delivered by pump 216E attained the desired 65% solids content enabling product to be withdrawn at such a rate that all the product was delivered within a few minutes after the completion of the stripping operation. Thus not only did the concurrent operation save the last 4 hours (concentrating time) of Example 1-A, but it also reduced the stripping time from 12 hours in Example 1-A to 8 hours in Example 1-B.

Example 1-C: Example 1-B was repeated, but with the following changes: (a) at the outset latex of 55% solids content reserved from a prior operation, in a sufficient amount to fill the concentration circuit from 216C via 216E and 216L to 220, was introduced into the separator collector 216; (b) the concentration and stripping cycles and the withdrawal of product at 55% solids were started substantially concurrently; and (c) the steam and emulsion flow rates were adjusted as before to attain maximum throughput without excessive foaming or excessive heating. In this example substantially the entire stripping operation was conducted at the augmented rate made possible by the simultaneous concentration, with corresponding economy of time. By withdrawing the combining latex at 55% solids, instead of 65% solids, it became possible to deliver the latex being concentrated from the heater 220 at a lower temperature and to deliver it to the collector 216 at a lower concentration, between 55 and 63%, and the resulting latex then had a somewhat smaller particle size. When the entire batch had been delivered at 55% solids, the stripping operation having been terminated, the 55% solids latex was then passed through the circulating cycle, without dilution with freshly stripped latex in the collector 216, until the desired concentration (63% solids in this instance) was attained. In this example, the concurrent stripping and concentrating steps, leading to a concentration of 55% solids, were conducted under substantially constant conditions of operation, thus corresponding to a continuously operated rather than a batch operated, process. The time required to effect the final isolated concentration of the product was compensated for by the saving of time effected by commencement at approximately the outset of the operation of the concurrent augmented rate stripping and concentration operations through the same collector 216. By conducting the final isolated concentration in a separate concentrating cycle and a separate collector, a completely continuous process may be provided.

Example 1-D: By repeating Example 1-A and circulating the initially produced latex via the distributor 216H (FIG. 7) until sufficient latex is collected to enable circulation through the concentrating circuit, the rate of supply of steam and emulsion to the mixer stripper 214 may be increased prior to the time when concentration is commenced, with consequent saving of stripping and overall processing time.

Example 1-E through 1-I: By repeating Examples 1 to 1-D, in the same equipment as employed in FIG. 7, but with a segregator such as the segregator 315 (FIGS. 8 and 9) substituted for the segregated 215 of FIG. 7, similar results and economies are obtainable.

Examples 1-J through 1-M: By repeating Examples 1 to 1-D, in the same equipment as employed in FIG. 7, but with a segregator such as that illustrated at 115 (FIG. 4) substituted for the segregator 215 of FIG. 7, similar results and economies are obtainable.

EXAMPLE 2

Preparation of ethylene-propylene rubber latex

To a sigma blade mixer were added 50 pounds of ethylene-propylene rubber (Enjay EPR rubber) [3] and 404 pounds of toluene, and after mixing 12 hours a clear rubber cement was obtained. A coarse emulsion was made by combining 454 pounds of this cement with an aqueous solution comprising 226 lbs. of water and 0.84 lb. of 36% hydrochloric acid and 5.0 pounds of 50% active quaternary ammonium compound sold under the trade name Redicote E-11 and consisting principally of the compound having the following formula:

$$C_{18}H_{37}N(CH_3)_2ClC_3H_6N(CH_3)_3Cl$$

and 1.0 lb. of a fatty acid diamine sold under the trade name Duomeen C which consists principally of the compound having the following formula:

$$C_{12}H_{25}NHC_3H_6NH_2$$

---

[3] Used in absence of a lower molecular weight EPR, which would have been preferred.

The temperature of the ethylene-propylene-toluene cement and the aqueous emulsion solution was maintained at 75° C. while mixing to form the coarse emulsion.

The coarse emulsion at 75° C. obtained in the sigma blade mixer was then passed twelve times through the homogenizing apparatus 112; disclosed by the present invention to be useful for preparing high polymer latices (described structurally for other uses in U.S. Pat. No. 3,195,867 granted to Harry W. Mould, Jr., July 20, 1965). The homogenizer was fitted with the stator set forth as FIG. 4 of the drawings of the Mould patent, and the machine was operated at 5200 r.p.m. with the aid of a 5 horsepower motor. The resulting fine cement-in-water emulsion showed no tendency to oil out, and thus was stable pending further processing.

The coarse emulsion of precursor latex sized particles was converted to a stripped latex of about 55% solids content, dry basis, by removal of toluene without detrimental foaming, and containing no observable floc or coagulum, by the same stripping procedures employed in Example 1. A portion of this stripped latex was then concentrated to a floc-free latex having a solids content of 55%, dry solids basis, by the same concentrating procedure used in Example 1, without detrimental foaming, and without loss of stability of the latex.

Examples 2-A through 2-M: By repeating Example 2, with the modifications of procedure set forth in Examples 1-A through 1-M, respectively, similar economies in stripping and overall processing times are obtainable.

EXAMPLE 3

Preparation of butyl rubber latex suitable for asphalt emulsions

To a sigma blade mixed was added 80 lbs. of butyl rubber and 320 lbs. of toluene. The mixer was run for twelve hours and a clear cement resulted. The temperature of this cement was raised to 75° C. and the cement was then mixed with 300 lbs. of water also heated to 75° C. and containing 1.3 lbs. of 36% hydrochloric acid and 8 lbs. of the trade name product Redicote E-11 (50% active and for composition refer to Example 2) and 1.6 lbs. of fatty acid diamine sold under the trade name Duomeen T which consists principally of the compound having the following formula:

$$C_{18}H_{37}NHC_3H_6NH_2$$

The temperature of the butyl rubber-toluene cement and the aqueous emulsion solution was maintained at 75° C. while mixing to form the coarse emulsion. The coarse emulsion was converted to a fine emulsion, stripped and concentrated according to the procedure set forth in Example 1 hereof and a latex product having 60% solids was obtained.

Examples 3-A through 3-M: By repeating Example 3, with the modification of procedure set forth in Example 1-A through 1-M, respectively, similar economies in stripping and overall processing times are obtainable.

EXAMPLE 4

Preparation of amorphous polypropylene rubber latex

Example 3 was repeated substituting 80 lbs. of amorphous polypropylene rubber for the butyl rubber, and using in place of the Redicote E-11 emulsifier a similar quantity of a quaternary ammonium emulsifier prepared by the complete alkylation with methylene chloride of Duomeen C, this emulsifier consisting principally of $$C_{12}H_{25} N(CH_3)_2Cl\ C_3H_6N(CH_3)_3Cl$$

the remaining materials and the procedures employed being unchanged, and the product being recovered at a concentration of 55% solids. This product is particularly advantageous for blending with asphalt compositions for road and roof surfacing, etc.

Examples 4-A through 4-M: By repeating Example 4, with the modifications of procedure set forth in Examples 1-A through 1-M, respectively, similar economies in stripping and overall processing time are obtainable.

EXAMPLE 5

Preparation of filled latex of high molecular weight of polyisobutylene (e.g. mol. wt. of 50,000 to 500,000)

To a sigma blade mixer are added: 50 lbs. of polyisobutylene having a weight average molecular weight of about 100,000; 10 lbs. of Hi-Sil 233 silica, pigment;[4] 1.0 lb. of dodecylamine; and 404 lbs. of toluene, and mixed until a clear smooth cement is obtained. A coarse emulsion is formed by combining the 464 lbs. of cement with 300 lbs. of water; 2.1 lbs. of 36% hydrochloric acid; 5.2 lbs. of the 50% quaternary ammonium compound employed in Example 2; 2.0 lbs. of the fatty acid diamine employed in Example 2; and mixing at 80° C. as set forth in Example 2.

The coarse emulsion is then passed 8 times through the homogenizing apparatus employed in Example 1, for producing the fine cement-in-water emulsion of precursor latex sized particles. After stripping and concentrating by the procedures of Example 1, a filled latex of polyisobutylene of 60% total solids content is obtained.

Examples 5-A through 5-M: By repeating Example 5, with the modifications of procedure set forth in Examples 1-A through 1-M, respectively, similar economies in stripping and in overall processing time are obtainable.

EXAMPLE 6

Preparation of a reinforced butyl rubber latex

On a rubber mill there was milled into 40 pounds of butyl rubber 10 pounds of Hi-Sil 233, a silica-type rubber reinforcing pigment. This product was dispersed in 220 pounds of toluene in 12 hours with the aid of a sigma blade mixer. To the resultant cement of high polymer composition was added 3.0 pounds of sodium salt of nonyl-phenyl ether of polyoxyethylene sulfate having about 4 ethylene oxide units, dry basis, and 208 pounds of water, and the mixture was heated to a temperature of 80° C. and mixed to form a coarse emulsion. The fine cement-in-water emulsion was prepared by passing the coarse emulsion 8 times through the homogenizing apparatus used in Example 1, and was then converted to floc-free stripped dilute latex of about 17% solids content, without detrimental foaming, and to concentrated floc-free latex of about 50% solids content, without detrimental foaming, by procedures like those used in Example 1. The reinforcing silica pigment particles were contained in the rubber particles of the latex where they are most effective as a reinforcing agent.

In this example the hydrated silica pigment may be replaced by an equivalent weight of medium thermal type rubber reinforcing carbon black, e.g. Thermax, introduced in the dissolved cement in the dissolver 15 as shown in FIG. 15, and/or other suitable reinforcing fillers; and the anionic emulsifier may be replaced by an equivalent quantity of mixed anionic and non-ionic emulsifiers, e.g. by replacing a third of it with Igepal 430 (a reaction product of one mole of nonylphenol and four moles of ethylene oxide) dry basis; or completely by nonionic emulsifier, e.g. by five pounds of the Igepal 430, dry basis.

Examples 6-A through 6-M: By repeating Example 6 with the modifications of procedure set forth in Examples 1-A through 1-M, respectively, similar economies in stripping and in overall processing time are obtainable.

---

[4] In this example the silica may be omitted when unfilled polymer latex is desired.

EXAMPLE 7

Preparation of latex from grafted butadiene styrene rubber

In a laboratory Banbury 1000 grams of butadiene-styrene copolymer rubber (SBR 1502), 40 grams of 2-vinylpyridine, 3 grams of cumene hydroperoxide and 1 gram of tetraethylenepentamine were mixed for 3 minutes at temperatures in excess of 325° F. to cause polar grafting of the batch of rubber. This grafting operation was repeated to produce 3 more batches and the four batches of grafted product were cooled and dissolved in 16 kilograms of mixed xylenes, with the aid of agitation, over a period of 12 hours. To the grafted SB-R cement was added 240 grams of the potassium salt of coconut oil fatty acids and 20 liters of water and after mixing a coarse emulsion was formed. The coarse emulsion was converted to a fine emulsion of precursor latex sized particles ready for stripping by twice passing through the homogenizing apparatus employed in Example 2 hereof. Further treatment by the procedures of Example 1, produced a substantially quantitative yield, dry solids basis, of dilute and concentrated latices of 2-vinyl pyridine grafted butadiene-styrene rubber.

Examples 7–A through 7–M: By repeating Example 7 with the modifications of procedure set forth in Examples 1–A through 1–M, respectively, similar economies in stripping and overall processing times are obtainable.

EXAMPLE 8

Preparation of latex of pigment reinforced cis-1,4-polybutadiene

In the laboratory Banbury were mixed 1000 grams of cis-1,4-polybutadiene and 400 grams of silica pigment (Hi-Sil 233). Four of these batches of Banbury mix were prepared and upon cooling were combined and dissolved in 20 kilograms of benzene containing 400 grams of hydroxyacetic acid salt of dodecylamine to which was added 20 liters of water and the mixture was heated to 80° C. while mixing, and the coarse emulsion so formed was passed ten times through the homogenizer equipment employed in Example 1 hereof, and the resulting fine emulsion was then stripped and concentrated by procedures essentially similar to those of Example 1. The stripped dilute latex was concentrated to about 50% solids, dry basis.

Examples 8–A through 8–M: By repeating Example 8 with the modifications of procedure set forth in Examples 1–A through 1–M, rspectively, similar economies in stripping and overall processing times are obtainable.

EXAMPLE 9

Preparation of latex of polyisobutylene

Into a closable, agitatible vessel are placed 40 lbs. of the trademarked product "Vistanex LM" (a polyisobutylene having a weight average molecular weight in the range of about 3,500 to 4,500) and 40 lbs. of toluene, and mixed until a clear smooth cement is obtained having a viscosity at 27° C. of about 8,000 centipoises. At 60° C. a coarse emulsion is formed by combining with the 100 pounds of cement, 50 lbs. of water, 10.8 pounds of the trademarked product Alipal CO–433 (sodium salt of the sulfate ester of the condensation product of nonylphenol with polyoxyethylene ethanol containing 4–6 ethyleneoxide units, 28% active) and 0.3 lb. of monosodium phosphate, and the mixture, while agitating, is recycled through a homogenizer circuit comprising in series the two forms of disperser 112 and 112A described above in connection with FIG. 2, each operated at 5,000 to 6,000 r.p.m. with the aid of a 15 horsepower motor, and then through a Rapisonic homogenizer of the type illustrated in U.S. Pat. No. 3,278,165 issued Oct. 11, 1966 to Gaffney. The resulting fine cement-in-water emulsion is then injected with steam as an initial continuous phase as illustrated in FIG. 7, in the ratio of about one to two pounds of steam per five lbs. of emulsion from which the solvent is to be vaporized, into the equipment 214, 215, 216, 220 referred to in FIG. 7, for removal of the solvent and concentration of the latex to 40% dry solids, the procedure being substantially as described in Example 1, and the resulting latex being stable and suitable for further concentration if desired.

EXAMPLE 10

Preparation of latex of mixed high polymers of different molecular weights

Example 1 is repeated, except that the cement is prepared with 70 lbs. of the butyl rubber, 30 lbs. of the trademarked product Piccopale 100 (a hydrocarbon polymer having a weight average molecular weight of about 1400 derived from raw materials composed essentially of diene and olefine monomers, said monomers having an approximate average molecular weight of about 90), and 370 lbs. of toluene, the 470 lbs. of cement being combined with 268 lbs. of water and with 18 lbs. of Alipal CO–433, 28% active (described in Example 9) to form the coarse emulsion, and except that the formation of the emulsion of precursor latex sized particles is expedited by a final homogenization with the Rapisonic homogenizer as described in Example 9. The solvent removal and concentration is the same as described in Example 1 and produces a stable latex containing from 60 to 65% dry solids.

EXAMPLE 11

Preparation of latex of mixed high polymers of different molecular weights

Example 10 is repeated except that the cement is formed with 70 lbs. of ethylene-propylene rubber (Enjay EPR rubber) 30 lbs. of the Piccopale-100, and 730 lbs. of toluene, and the coarse emulsion is prepared from the 830 lbs. of cement and 470 lbs. of water with 21 lbs. of the Alipal CO–433, 28% active, the latex concentration being carried to 55 to 60% solids.

EXAMPLE 12

Preparation of latex of resin extended elastomer

In this Example 12, Example 10 is repeated except that the cement is formed from 70 lbs. of the butyl rubber, 30 lbs. of coumarone-indene resin (Neville Resin R–17, a trademarked resin) and 260 lbs. of water and with 18 lbs. of the Alipal CO–433, 28% active, to form the emulsion.

As will be appreciated by one skilled in the art, by repetition of any of the foregoing examples, but with substitution of the alternative procedures described for those employed therein, similar results and corresponding advantages may be attained.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. In the formation of a latex from an organic solvent dispersion of a composition of an organic solvent soluble or dispersible high polymer selected from the group consisting essentially of natural rubber and high polymers of ethylenically unsaturated monomers containing from 2 to 20 carbon atoms by a process which comprises:
   (1) providing a dispersion of the polymer composition in essentially water-immiscible volatile solvent which itself or as an azeotrope with water has a boiling point lower than that of water at atmospheric pressure, (2) adding water and emulsifier to said dispersion in proportions to form an emulsion having water as its continuum and emulsifying the same so that the discontinuous phase thereof is in particles of precursor latex size, (3) stripping the solvent from the emulsion to form an essentially solvent free latex, and (4) recovering the latex product, the improvement which consists in the combination in the process of the further steps of:

(5) providing a moving flow of gas comprising steam as an initial continuous phase, (6) dispersing the emulsion formed in step (2) into said flow of gas as the initial continuous phase while subjecting the phases to a decrease of pressure and maintaining the temperature thereof below the limiting temperature for stability of the emulsion, thereby vaporizing solvent from the dispersed droplets and forming essentially solvent free droplets of latex and vapor, (7) establishing a separating zone maintained at a pressure below the decreased pressure attained in step (6), (8) establishing a flow of latex of the selected high polymer other than the flow of steps (5) and (6) through said separating zone, (9) introducing into said separating zone the droplets of latex and vapor produced by step (6) and impinging said droplets upon the flow of latex therein,

(10) with drawing vapor from said separating zone, and

(11) with drawing the combined latices from said separating zone.

2. A process as claimed in claim 1, in which in step (2) the emulsion is effected with the aid of a mixture of cationic emulsifiers.

3. A process as claimed in claim 2, in which said mixture comprises an emulsifier which is a quaternary ammonium salt.

4. A process as claimed in claim 3, in which said mixture also comprises an emulsifier other than a quaternary ammonium salt.

5. A process as claimed in claim 4, in which one of the emulsifiers of the mixture is selected from the primary amines derived from fatty acid material containing from 8 to 22 carbon atoms.

6. A process as claimed in claim 5, in which the quaternary ammonium salt is one derived from fatty acid material containing from 8 to 22 carbon atoms.

7. A process as claimed in claim 3, in which the quaternary ammonium salt is represented by the formula $$[R-\underset{\underset{CH_3}{|}}{\overset{\overset{CH_3}{|}}{N}}-(CH_2)_3-\underset{\underset{CH_3}{|}}{\overset{\overset{CH_3}{|}}{N}}-CH_3]^{++}_2[X]^-$$

where R is an alkyl group containing from 8 to 22 carbon atoms and X is an acid anion.

8. A process as claimed in claim 1, in which the polymer employed in step (1) is a rubbery polymer.

9. A process as claimed in claim 8, in which the rubbery polymer contains from 0 to 5 mole percent unsaturation.

10. A process as claimed in claim 9, in which the rubbery polymer is selected from the butyl rubbers.

11. A process as claimed in claim 9, in which the rubbery polymer is selected from the chlorinated butyl rubbers.

12. A process as claimed in claim 9, in which the rubbery polymer is selected from the group of rubbery propylene polymers consisting of the rubbery ethylene-propylene copolymers, ethylene-propylene-diene terpolymers, and amorphous polypropylene.

13. A process as claimed in claim 8, in which the rubbery polymer is a solution polymerized diene polymer which contains more than 5 mole percent unsaturation.

14. A process as claimed in claim 13, in which the rubbery polymer is selected from the group consisting of the solution polymerized butadiene polymers and copolymers and the solution polymerized isoprene polymers and copolymers.

15. A process as claimed in claim 1, in which the organic polymer is a non-rubbery polymer.

16. A process as claimed in claim 15, in which the non-rubbery polymer is selected from the group consisting of the solution polymerized homopolymers and copolymers of ethylene and the homopolymers and copolymers of propylene.

17. An improvement as claimed in claim 1, in which the polymer composition from which the dispersion is formed in step (1) comprises filler material as an essential part thereof.

18. An improvement as claimed in claim 17, in which the polymer composition from which the dispersion is formed in step (1) comprises as an essential part thereof filler material selected from the class consisting of the reinforcing carbon blacks, the reinforcing siliceous pigments, and the insoluble organic fillers.

19. An improvement as claimed in claim 1, in which in step (2) filler material is incorporated in the discontinuous phase of the precursor latex size particles.

20. An improvement as claimed in claim 19, in which the filler material incorporated in step (2) comprises insoluble organic filler.

21. An improvement as claimed in claim 1, in which the polymer employed in step (1) is polyisobutylene.

22. An improvement as claimed in claim 1, in which the polymer employed in step (1) is an ethylene-inylacetate copolymer.

23. An improvement as claimed in claim 1, in which the solvent employed in step (6) consists essentially of solvent selected from the aromatic hydrocarbon compounds containing from 6 to 9 carbon atoms.

24. A process as claimed in claim 1, characterized in the steps of:

(12) forming the dispersion in step (1) in such proportions that the dispersion has a viscosity at room temperature of at least 4000 centipoises, and

(13) effecting the emulsification in step (2) by
   (a) forming a coarse emulsion of the so formed viscous solvent dispersion, water and emulsifier, and
   (b) converting said coarse emulsion into an emulsion of particles of precursor latex size by homogenizing.

25. A process as claimed in claim 1, further comprising the steps of:

(12) delivering a part of the combined latices withdrawn in step (11) to a concentrating zone,

(13) subjecting the combined latices in said concentrating zone to heating and reduction of pressure under conditions of turbulence while maintaining the latex at temperatures within the limiting range for stability of the latex, thus to produce concentrated latex and vapor therefrom, and

(14) introducing said concentrated latex and vapor into said separating zone to form the flow of latex therein.

26. A process as claimed in claim 25, in which the process is conducted so that in step (6) the latex formed contains from about 5% to 20% solids, and so that the combined latices withdrawn from the separator in step (11) contain from about 38% to 68% solids, by weight.

27. A process as claimed in claim 1, in which the impingement is conducted without any partial separation of the liquid phase from the gaseous phase produced in step (6), prior to such impingement.

28. A process as claimed in claim 1, in which the vapor-carried latex produced by step (6) is subjected to a partial separation of its liquid and gaseous phases before the liquid droplets thereof are impinged on the flow of latex, established in step (8).

29. A process as claimed in claim 1, in which the moving flow of gas in step (5) is supplied at a sub-atmospheric pressure and a gas temperature of about 100 to 200° F., while the oil-in-water emulsion dispersed therein in step (6) is supplied at a temperature in the range of about 50 to 180° F. which is at least 20° F. lower than the gas temperature.

30. In the formation of a latex from an organic solvent dispersion of a composition of an organic solvent soluble or dispersible high polymer selected from the group consisting essentially of natural rubber and high polymers of ethylenically unsaturated monomers containing from 2 to 20 carbon atoms, by a process which comprises:
  (1) providing a dispersion of the polymer composition in essentially water-immiscible volatile solvent which itself or as an azeotrope with water has a boiling point lower than that of water at atmospheric pressure,
  (2) adding water and emulsifier to said dispersion in proportions to form an emulsion having water as its continuum and emulsifying the same so that the discontinuous phase thereof is in particles of precursor latex size,
  (3) stripping the solvent from the emulsion to form an essentially solvent free latex, and
  (4) recovering the latex product,
the improvement which consists in the combination in the process of the further steps of:
  (5) providing a moving flow of gas comprising steam as an initial continuous phase,
  (6) dispersing the emulsion formed in step (2) into said flow of gas as the initial continuous phase while subjecting the phases to a decrease of pressure and maintaining the temperature thereof below the limiting temperature for stability of the emulsion, thereby vaporizing solvent from the dispersed droplets and forming essentially solvent free droplets of latex and vapor,
  (7) establishing a flow of latex of the selected high polymer other than the gas carried flow of step (6),
  (8) impinging upon the latex of the flow established in step (7) the latex droplets and the vapor produced by step (6), and
  (9) separating the liquid and gaseous phases resulting from step (8).

31. A process as claimed in claim 30 in which the flow established in step (7) comprises a greater quantity of latex than that produced by step (6), per unit of time.

32. A process as claimed in claim 31 in which the quantity of latex in the flow established in step (7) is a number of times greater than that produced by step (6), per unit of time.

33. A process as claimed in claim 30 in which the flow of latex established in step (7) is being subjected to centrifugal force when the latex droplets from step (6) are impinged thereon.

34. A process as claimed in claim 30 in which the droplets of latex produced by step (6) are in part combined with one another prior to step (8).

35. A process as claimed in claim 34 in which the partial combining of the droplets is effected by passing the same through a tortuous path.

36. A process as claimed in claim 34 in which the partial combining of the droplets is effected by subjecting the same to centrifugal force.

37. In the formation of a latex from an organic solvent dispersion of a composition of an organic solvent soluble or dispersible high polymer, by a process which comprises:
  (1) providing a dispersion of the polymer composition in essentially water-immiscible volatile solvent which itself or as an azeotrope with water has a boiling point lower than that of water at atmospheric pressure,
  (2) adding water and emulsifier to said dispersion in proportions to form an emulsion having water as its continuum and emulsifying the same so that the discontinuous phase thereof is in particles of precursor latex size,
  (3) stripping the solvent from the emulsion to form an essentially solvent free latex, and
  (4) recovering the latex product,
the improvement which consists in the combination in the process of the further steps of:
  (5) providing a moving flow of gas comprising steam as an initial continuous phase,
  (6) dispersing the emulsion formed in step (2) into said flow of gas as the initial continuous phase while subjecting the phases to a decrease of pressure and maintaining the temperature thereof below the limiting temperature for stability of the emulsion, thereby vaporizing solvent from the dispersed droplets and forming essentially solvent free droplets of latex and vapor,
  (7) establishing a flow of latex other than the gas carried flow of step (6),
  (8) impinging upon the latex of the flow established in step (7) the latex droplets and the vapor produced by step (6), and
  (9) separating the liquid and gaseous phases resulting from step (8).

38. A process as claimed in claim 37 in which the dispersion provided in step (1) is formed with at least two different high polymers.

39. A process as claimed in claim 37 in which the polymer dispersion provided in step (1) comprises processing material selected from the class of plasticisers and softeners.

40. A process as claimed in claim 37 in which the flow of latex established in step (7) comprises a polymer composition other than that provided in step (1) and the liquid phase separated in step (9) comprises a mixed polymer latex.

References Cited

UNITED STATES PATENTS

| 3,129,132 | 4/1964 | Gudheim | 260—29.7 PT |
| 3,281,386 | 10/1966 | Moss | 260—29.7 |
| 3,432,483 | 3/1969 | Peoples et al. | 260—87.3 |
| 3,445,414 | 5/1969 | Glymph et al. | 260—29.6 PT |
| 3,503,917 | 3/1970 | Burke | 260—29.6 |

PHILIP E. ANDERSON, Primary Examiner

A. H. KOECKERT, Assistant Examiner

U.S. Cl. X.R.

260—29.2, 29.6, 34.2, 819